United States Patent
Fukuda

(10) Patent No.: US 11,368,593 B2
(45) Date of Patent: Jun. 21, 2022

(54) IMAGE FORMING SYSTEM ALLOWING VOICE OPERATION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Masato Fukuda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/244,181

(22) Filed: Apr. 29, 2021

(65) Prior Publication Data

US 2021/0360113 A1 Nov. 18, 2021

(30) Foreign Application Priority Data

May 13, 2020 (JP) .............................. JP2020-084478

(51) Int. Cl.
*H04N 1/00* (2006.01)
*G06F 9/451* (2018.01)

(52) U.S. Cl.
CPC ......... *H04N 1/00403* (2013.01); *G06F 9/454* (2018.02); *H04N 1/00437* (2013.01); *H04N 2201/0094* (2013.01)

(58) Field of Classification Search
CPC ........... H04N 1/00403; H04N 1/00437; H04N 2201/0094; G06F 9/454
USPC ....................................................... 358/1.13
See application file for complete search history.

(56) References Cited

U.S. PATENT DOCUMENTS

| 10,567,602 | B2 | 2/2020 | Maeda | |
| 2019/0020776 | A1* | 1/2019 | Maeda | .................. H04W 12/50 |
| 2020/0175984 | A1* | 6/2020 | Iwasa | .................. H04N 1/00498 |
| 2020/0213466 | A1* | 7/2020 | Ochi | .................. H04N 1/00912 |

FOREIGN PATENT DOCUMENTS

JP 2019018394 A 2/2019

* cited by examiner

*Primary Examiner* — Neil R McLean
(74) *Attorney, Agent, or Firm* — Rossi, Kimms & McDowell LLP

(57) ABSTRACT

An image forming system that is capable of reducing time and effort of a user for setting a display language. The image forming system including the following members. An image forming device forms an image on a sheet. A display device displays information. A microphone obtains voice. An obtainment unit obtains a plurality of pieces of word information based on audio information on the phrase obtained through the microphone. A specification unit specifies a language using the plurality of word information. An update unit updates a display language of the display unit based on the language specified by the specification unit.

11 Claims, 32 Drawing Sheets

| GROUP ID | VOICE RECOGNITION RESULT | | LDE FLAG |
|---|---|---|---|
| | KANA | KANA-KANJI CONVERSION | |
| FNC00000 | KINOU | 機能(FUNCTION) | NO |
| | FUANKUSHON | | YES |
| FNC00001 | KOPI | | YES |
| | FUKUSHA | 複写(COPY) | NO |
| | FUKUSEI | 複製(DUPLICATE) | NO |
| FNC00002 | INSATSU | 印刷(PRINT) | NO |
| | PURINTO | | YES |
| FNC00003 | SETTEI | 設定(SETTING) | NO |
| | SETTEINGU | | YES |
| FNC00004 | MERU SOUSHIN | メール送信(MAIL SEND) | NO |
| | SENDO MERU | | YES |
| | SENDO I-MERU | | YES |

⋮

712 —

| GROUP ID | VOICE RECOGNITION RESULT | | LDE FLAG |
|---|---|---|---|
| | KANA | KANA-KANJI CONVERSION | |
| NUM00000 | ZERO | 0,零(ZERO) | YES |
| | REI | 0,零(ZERO) | NO |
| | ZEROBAN | 0番,零番(ZEROTH) | NO |
| | REIBAN | 0番,零番(ZEROTH) | NO |
| NUM00001 | ICHI | 1,一(ONE) | NO |
| | ICHIBAN | 1番,一番(FIRST) | NO |
| | HITOTSUME | 1つ目,一つ目(FIRST) | NO |
| NUM00002 | NI | 2,二(TWO) | NO |
| | NIBAN | 2番,二番(SECOND) | NO |
| | FUTATSUME | 2つ目,二つ目(SECOND) | NO |
| NUM00003 | SAN | 3,三(THREE) | NO |
| | SANBAN | 3番,三番(THIRD) | NO |
| | MITTSUME | 3つ目,三つ目(THIRD) | NO |
| NUM00004 | YON | 4,四(FOUR) | NO |
| | YONBAN | 4番,四番(FOURTH) | NO |
| | YOTTSUME | 4つ目,四つ目(FOURTH) | NO |

⋮

713 —

| GROUP ID | VOICE RECOGNITION RESULT | | LDE FLAG |
|---|---|---|---|
| | KANA | KANA-KANJI CONVERSION | |
| CNF00001 | BU | 部(COPIES) | NO |
| | BUSU | 部数(NUMBER OF COPIES) | NO |
| CNF00002 | NOUDO | 濃度(DENSITY) | NO |
| | KOSA | 濃さ(DENSITY) | NO |
| | KOKU | 濃く(THICK) | NO |
| CNF00003 | SENMEI | 鮮明(SHARP) | NO |
| | SHAPU | | YES |
| | SHAPUNESU | | YES |
| CNF00004 | ATESAKI | 宛先(ADDRESS) | NO |

⋮

LDE FLAG:
LANGUAGE DETERMINATION EXCEPTION FLAG

FIG. 7C

Table 721:

| GROUP ID | VOICE RECOGNITION RESULT | |
|---|---|---|
| | ALPHABET | LDE FLAG |
| FNC00000 | FUNCTION | YES |
| | FUNC | NO |
| FNC00001 | COPY | YES |
| | COPIES | NO |
| FNC00002 | PRINT | YES |
| | PRINTING | NO |
| FNC00003 | SET | YES |
| | SETTING | YES |
| FNC00004 | SEND MAIL | YES |
| | SEND E-MAIL | YES |

⋮

Table 722:

| GROUP ID | VOICE RECOGNITION RESULT | |
|---|---|---|
| | ALPHABET | LDE FLAG |
| NUM00000 | ZERO | YES |
| NUM00001 | ONE | NO |
| | FIRST | YES |
| NUM00002 | TWO | NO |
| | SECOND | YES |
| NUM00003 | THREE | NO |
| | THIRD | YES |
| NUM00004 | FOUR | NO |
| | FOURTH | YES |

⋮

Table 723:

| GROUP ID | VOICE RECOGNITION RESULT | |
|---|---|---|
| | ALPHABET | LDE FLAG |
| CNF00001 | COPY | YES |
| | COPIES | NO |
| CNF00002 | DENSITY | NO |
| | DENSITIES | NO |
| CNF00003 | SHARP | YES |
| | SHARPNESS | YES |
| CNF00004 | TO | NO |

⋮

LDE FLAG:
LANGUAGE DETERMINATION EXCEPTION FLAG

FIG. 8

```
{
    "language": "Japanese"
    "command":[
        {
            "operation": "jobStart"
        },
        {
            "parameter":{
                "jobName": "copy",
                    "copies": "4",
            },
        }
    ]
}
```

FIG. 9

```
{
    "language": "English"
    "command":[
        {
            "operation": "jobSetting"
        },
        {
            "parameter":{
                "jobName": "copy",
                "Density": "4",
            },
        }
    ]
}
```

*FIG. 30*

| INPUT AUDIO DATA | LANGUAGE DETERMINATION RESULT |
|---|---|
| コピー(KOPI) | UNKNOWN |
| 4部コピーして (YONBUKOPISHITE) | JAPANESE |
| COPY | UNKNOWN |
| FOUR COPIES | ENGLISH |
| 濃度設定4 (NOUDOSETTEIYON) | JAPANESE |
| コピーセッティング (KOPISETTEINGU) | UNKNOWN |
| SET DENSITY FOUR | ENGLISH |
| COPY SETTING | UNKNOWN |

# IMAGE FORMING SYSTEM ALLOWING VOICE OPERATION, CONTROL METHOD THEREFOR, AND STORAGE MEDIUM STORING CONTROL PROGRAM THEREFOR

BACKGROUND OF THE INVENTION

Field of the Invention

The present invention relates to an image forming system that allows a voice operation, a control method therefor, and a storage medium that stores a control program therefor.

Description of the Related Art

An image forming apparatus like a printer that cooperates with a smart speaker is known (for example, see Japanese Laid-Open Patent Publication (Kokai) No. 2019-18394 (JP 2019-18394A)). A user can perform various settings of the image forming apparatus by inputting voice into the smart speaker. The image forming apparatus may be shared by a plurality of users who use different languages in an office, for example. Accordingly, a comfortable operating environment differs for every user. A user changes a language used in the image forming apparatus, such as a display language of a display device of the image forming apparatus, by inputting voice to the smart speaker.

However, since a user is required to change the setting of a display language of the display device whenever the user starts to use the conventional image forming apparatus, it takes time and effort.

SUMMARY OF THE INVENTION

The present invention provides an image forming system, a control method therefore, and a storage medium storing a control program therefor, which are capable of reducing time and effort of a user for setting a display language.

Accordingly, a first aspect of the present invention provides An image forming system including an image forming device configured to form an image on a sheet, a display device configured to display information, a microphone configured to obtain voice, an obtainment unit configured to obtain a plurality of pieces of word information based on audio information on the phrase obtained through the microphone, a specification unit configured to specify a language using the plurality of word information, and an update unit configured to update a display language of the display unit based on the language specified by the specification unit.

Accordingly, a second aspect of the present invention provides a control method for the image forming system having the image forming device, the display device, and the microphone, the control method including obtaining a plurality of pieces of word information based on audio information on a phrase obtained through the microphone, specifying a language using the plurality of pieces of word information, and updating a display language of the display device based on the specified language.

Accordingly and a third aspect of the present invention provides a non-transitory computer-readable storage medium storing a control program causing a computer to execute the control method of the second aspect.

According to the present invention, the time and effort of a user for setting a display language is reducible.

Further features of the present invention will become apparent from the following description of exemplary embodiments with reference to the attached drawings.

BRIEF DESCRIPTION OF THE DRAWINGS

FIG. 7A, FIG. 7B, and FIG. 7C are views for describing an audio data conversion control module as a software module of the cloud server in FIG. 1.

FIG. 8 is a view showing an example of job information having a language setting (hereinafter referred to as "language-set job information") that the cloud server in FIG. 1 generates.

FIG. 9 is a view showing an example of language-set job information that the cloud server in FIG. 1 generates.

FIG. 30 is a view showing examples of language determination results in the embodiment.

DESCRIPTION OF THE EMBODIMENTS

Figure 1:
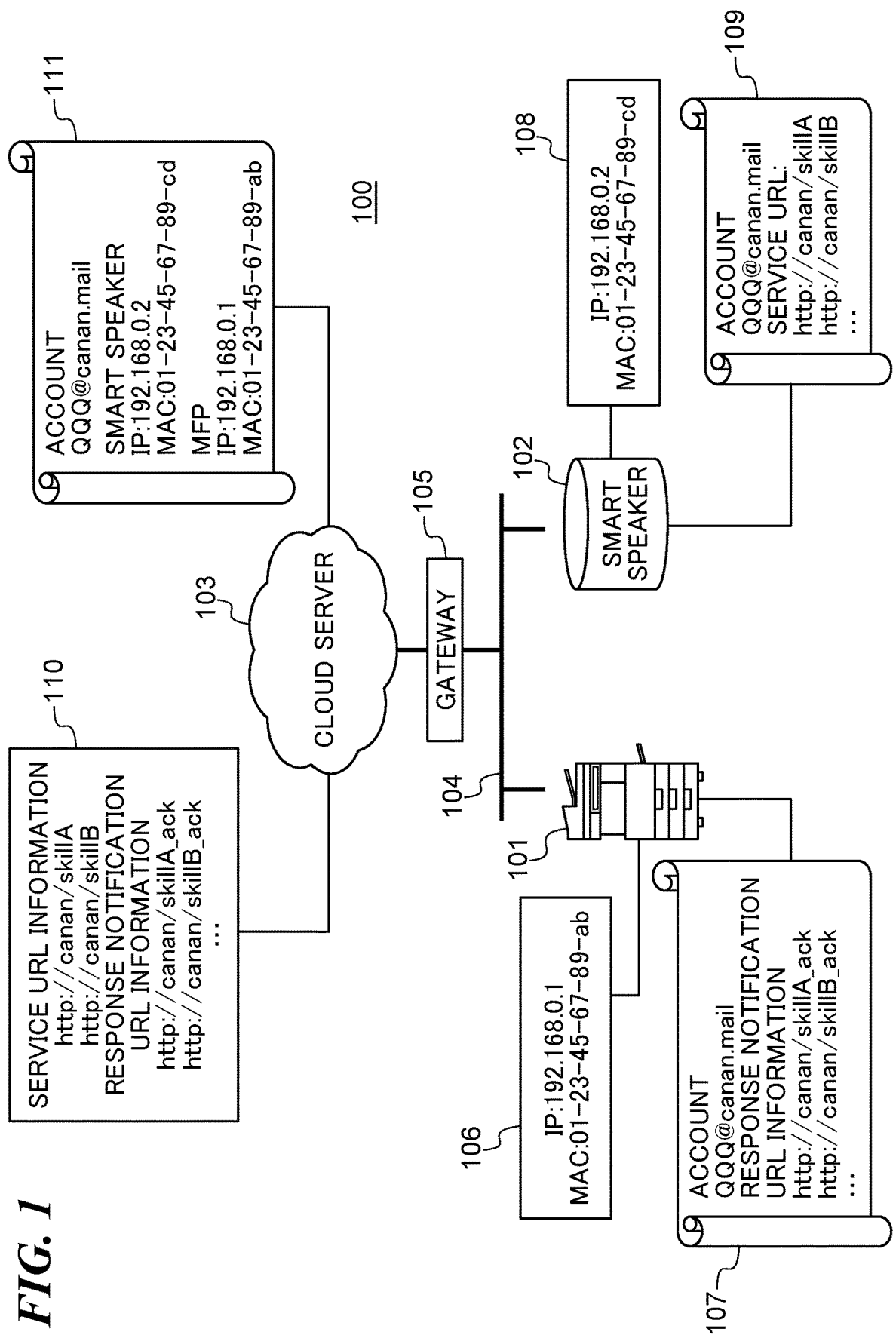
FIG. 1 is a configuration diagram showing an image forming system according to an embodiment of the present invention.

Hereafter, embodiments according to the present invention will be described in detail by referring to the drawings. It should be noted that the following embodiment does not restricts the invention according to the claims and all combinations of characteristic features described in the embodiment are not always indispensable to the solution of the invention.

FIG. 1 is a configuration diagram showing an image forming system 100 according to the embodiment of the present invention. As shown in FIG. 1, the image forming system 100 is provided with an MFP (Multi-Function Peripheral) 101 as an image forming apparatus, a smart speaker 102 as a voice obtainment device, and a cloud server 103. The MFP 101 and smart speaker 102 are connected to a network 104. And the cloud server 103 is connected to the network 104 through a gateway 105. Thereby, the MFP 101, smart speaker 102, and cloud server 103 are communicable through the network 104.

The image forming system 100 is able to control the MFP 101 to execute a process corresponding to a user's voice operation that the smart speaker 102 obtains. For example, when a user gives a copy job execution instruction, such as "copy this", the smart speaker 102 transmits audio data (audio information) corresponding to the copy job execution instruction to the cloud server 103 through the network 104. When receiving the audio data, the cloud server 103 generates device operation data corresponding to the audio data and transmits the device operation data to the MFP 101 through the network 104. The MFP 101 executes a copy job as a process corresponding to the received device operation data and transmits a response, which indicates that the copy job has been executed, to the cloud server 103 through the network 104. When receiving the response, the cloud server 103 generates response message data and transmits the response message data to the smart speaker 102 through the network 104. The smart speaker 102 outputs an audio message of "Now copying" that corresponds to the received response message data.

The MFP 101 is a multifunction apparatus equipped with a plurality of functions, such as a print function and a scan function. The MFP 101 is provided with MFP's own apparatus data 106 and MFP's other apparatus data 107. The MFP's own apparatus data 106 includes an IP address and a MAC address of the MFP 101 that are used in data communications through the network 104. The MFP's other apparatus data 107 includes account information used when the MFP 101 uses a service of the cloud server 103 and URL information about a response notification that notifies the cloud server 103 of an execution result of the process corresponding to the device operation data that is received from the cloud server 103, for example.

The smart speaker 102 is a loudspeaker equipped with an audio assistant function and is provided with smart speaker's own apparatus data 108 and smart speaker's other apparatus data 109. The smart speaker's own apparatus data 108 includes an IP address and a MAC address of the smart speaker 102 that are used in data communications through the network 104. The smart speaker's other apparatus data 109 includes account information used when the smart speaker 102 uses a service of the cloud server 103 and a service URL of the cloud server 103 corresponding to a wake word mentioned later.

The cloud server 103 is provided with cloud server's own apparatus data 110 and cloud server's other apparatus data 111. The cloud server's own apparatus data 110 includes service URL information used when the MFP 101 or the smart speaker 102 uses a service of the cloud server through the network 104 and the above-mentioned URL information about a response notification. The cloud server's other apparatus data 111 includes account information issued to the MFP 101 and the smart speaker 102, and IP addresses and MAC addresses of the MFP 101 and smart speaker 102. The cloud server 103 communicates with the MFP 101 and smart speaker 102 through the network 104 by using the IP addresses and MAC addresses included in the cloud server's other apparatus data 111.

Various kinds of data, such as audio data that the smart speaker 102 generates and device operation data that the cloud server 103 generates, are transmitted and received through the network 104. The gateway 105 is a wireless LAN router based on IEEE802.11 standards, such as IEEE802.11a and IEEE802.11b, for example. It should be noted that the gateway 105 may be a configuration based on a wireless communication standard other than the IEEE802.11 standards. Moreover, the gateway 105 may be a wired LAN router based on Ethernet standards, such as 10BASE-T, 100BASE-T, and 1200BASE-T.

Figure 2:
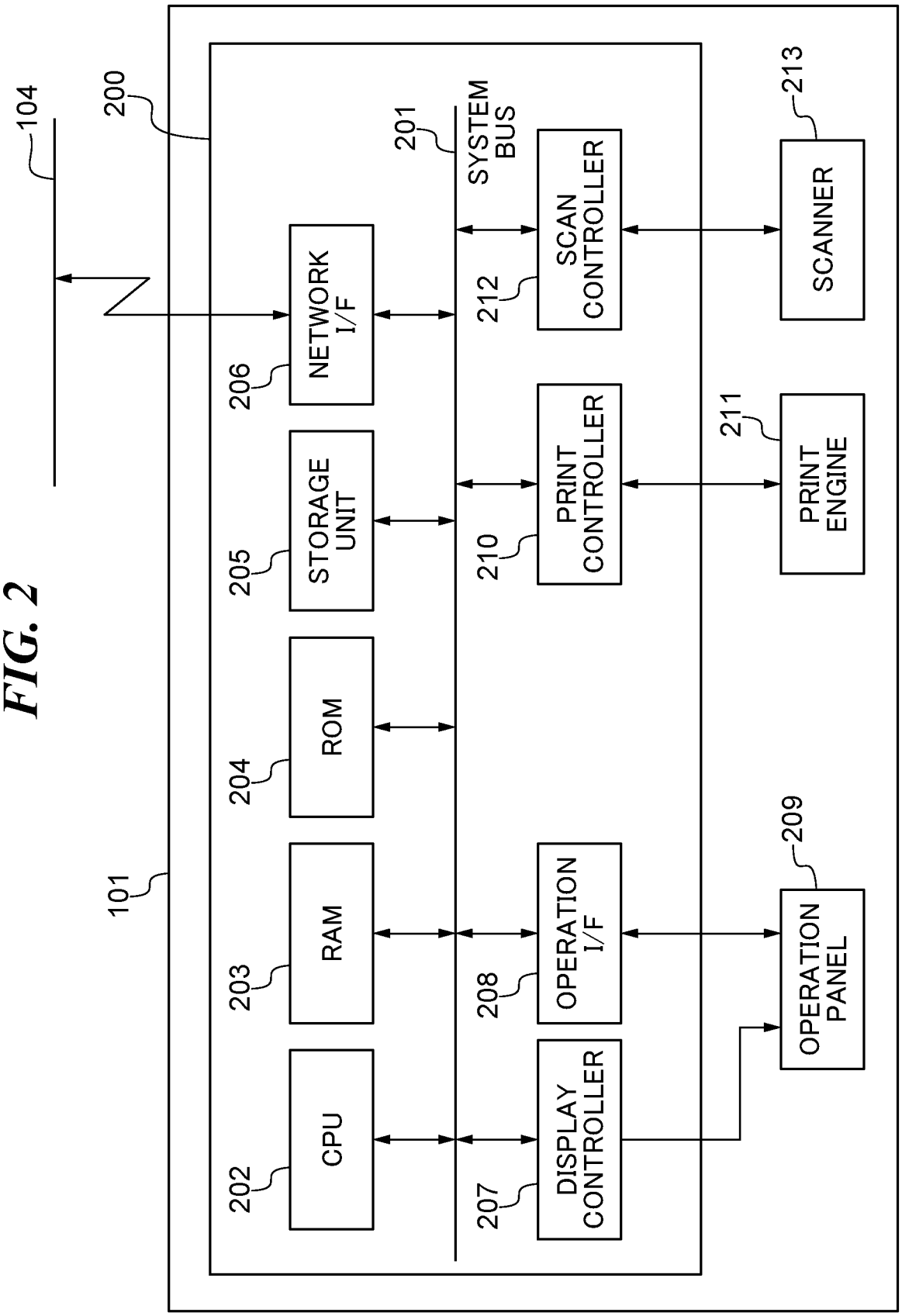
FIG. 2 is a block diagram schematically showing a hardware configuration of an MFP in FIG. 1.

FIG. 2 is a block diagram schematically showing a hardware configuration of the MFP 101 in FIG. 1. As shown in FIG. 2, the MFP 101 is provided with a controller 200, an operation panel 209, a print engine (an image forming device) 211, and a scanner 213. The controller 200 is connected with the operation panel 209, print engine 211, and scanner 213. Moreover, the controller 200 is provided with a CPU (Central Processing Unit) 202, a RAM 203, a ROM 204, a storage unit 205, a network I/F 206, a display controller 207, an operation I/F 208, a print controller 210, and a scan controller 212. The CPU 202, RAM 203, ROM 204, storage unit 205, network I/F 206, display controller 207, operation I/F 208, print controller 210, and scan controller 212 are mutually connected through a system bus 201.

The CPU 202 controls operations of the entire MFP 101. The CPU 202 reads a control program stored in the ROM 204 or the storage unit 205 and performs various control processes, such as a reading control process and a printing control process. The RAM 203 is a main memory of the CPU 202. The RAM 203 is used as a work area of the CPU 202 and as a temporary storage area to which the control program stored in the ROM 204 or the storage device 205 will be developed. The ROM 204 stores the control program that the CPU 202 runs. The storage unit 205 stores print data, image data, programs, setting information, etc. Although the MFP 101 of the embodiment is configured so that the single CPU 202 will execute processes mentioned later using a single memory (the RAM 203), the configuration of the MFP 101 is not restricted to this configuration. For example, the MFP 101 may be configured so that a plurality of CPUs, RAMs, ROMs, and storage units will cooperatively execute the processes mentioned later. Moreover, the MFP 101 may execute some processes using a hardware circuit, such as an ASIC (Application Specific Integrated Circuit) or an FPGA (Field-Programmable Gate Array).

The network I/F 206 is used when the MFP 101 communicates with another apparatus through the network 104. For example, the MFP 101 analyzes print data received through the network I/F 206 by a PDL analysis module (not shown). The PDL analysis module is a software module for analyzing print data and generates image data, which is printed by the print engine 211, on the basis of the print data expressed by various kinds of page description languages. A program for booting the PDL analysis module is stored in the storage unit 205 or the ROM 204.

The display controller 207 and operation I/F 208 are connected with the operation panel 209. The operation I/F 208 performs display control of a screen of the operation panel 209. When a user operates the operation panel 209, the MFP 101 obtains an event corresponding to the user's operation through the display controller 207.

The print controller 210 is connected with the print engine 211. The print controller 210 transfers the image data that is generated by the above-mentioned PDL analysis module to the print engine 211. The print engine 211 forms the received image data on a sheet. An electrophotographic system, an ink jet system, or the like is used as a printing system of the print engine 211. When the electrophotographic system is used, an image is formed on a sheet by developing an electrostatic latent image formed on a photosensitive member, transferring a developed toner image to a sheet, and fixing the transferred toner image. When the ink jet system is used, an image is formed on a sheet by discharging ink.

The scan controller 212 is connected with the scanner 213. The scanner 213 reads an image on a sheet and generates image data. The image data generated by the scanner 213 is stored in the storage unit 205. Moreover, an image is formed on a sheet using the image data that the scanner 213 generates. The scanner 213 has a document feeder (not shown) and can read documents stacked on the document feeder by conveying them one by one.

Figure 3:
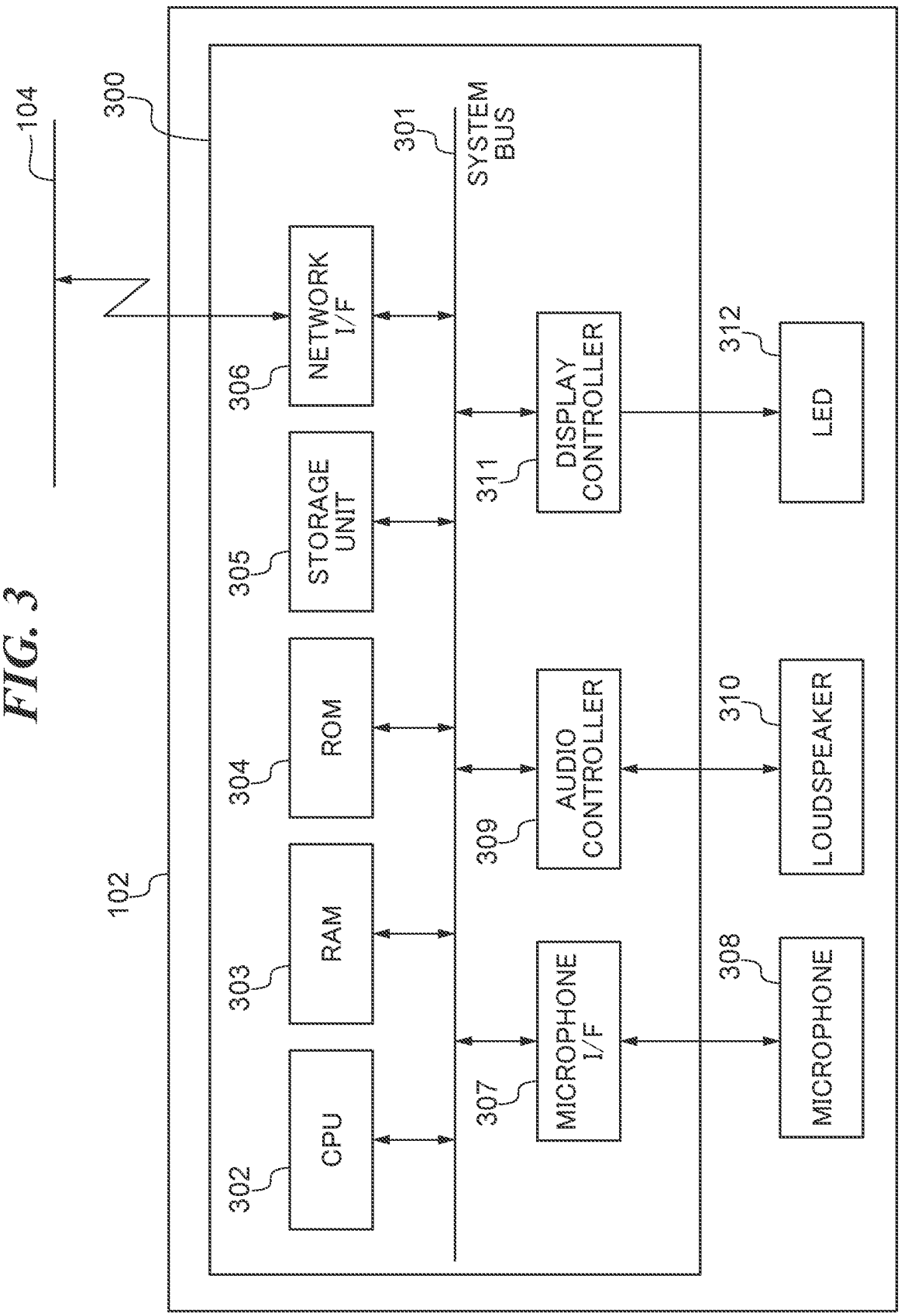
FIG. 3 is a block diagram schematically showing a hardware configuration of a smart speaker in FIG. 1.

FIG. 3 is a block diagram schematically showing a hardware configuration of the smart speaker in FIG. 1. As shown in FIG. 3, the smart speaker 102 is provided with a controller 300, a microphone 308, a loudspeaker 310, and an LED 312. The controller 300 is connected with the microphone 308, loudspeaker 310, and LED 312. Moreover, the controller 300 is provided with a CPU 302, a RAM 303, a ROM 304, a storage unit 305, a network I/F 306, a microphone I/F 307, an audio controller 309, and a display controller 311. The CPU 302, RAM 303, ROM 304, storage unit 305, network I/F 306, microphone I/F 307, audio controller 309, and display controller 311 are mutually connected through a system bus 301.

The CPU 302 is a central processing unit that controls operations of the entire controller 300. The RAM 303 is a volatile memory. The ROM 304 is a nonvolatile memory and stores a boot program of the CPU 302. The storage unit 305 is a storage device with a larger memory capacity than the RAM 303 and may be an SD card. It should be noted that the storage unit 305 may be a flash ROM, not the SD card, or may be another storage device having a function equivalent to that of the SD card. For example, the storage unit 305 stores a control program of the smart speaker 102 that the controller 300 executes.

When booting the smart speaker 102 in response to a power ON operation by a user, the CPU 302 runs a boot program stored in the ROM 304. The boot program reads a control program stored in the storage unit 305 and develops the control program concerned onto the RAM 303. The CPU 302 runs the control program developed onto the RAM 303 and performs various control processes. Moreover, the CPU 302 stores data used when running the control program into the RAM 303 or the storage unit 305. The CPU 302 communicates with another apparatus on the network 104 through the network I/F 306.

The network I/F 306 includes a circuit and an antenna that enable communication according to the wireless communication system based on IEEE802.11 standard. It should be noted that the network I/F 306 may employ a cable communication system based on the Ethernet standard, not the wireless communication system. The microphone I/F 307 is connected to the microphone 308. The microphone I/F converts user's voice received by the microphone 308 into coded audio data and stores the converted audio data into the RAM 303 in accordance with an instruction from the CPU 302.

The microphone 308 is a compact MEMS microphone mounted in a smart phone etc., for example. It should be noted that the microphone 308 is not limited to the MEMS microphone and may be another device that can obtain user's voice. In the embodiment, it is preferable to arrange three or more microphones 308 at predetermined positions in order to specify an arrival direction of user's voice.

The audio controller 309 is connected to the loudspeaker 310. The audio controller 309 converts the audio data into an analog voice signal in accordance with an instruction from the CPU 302 and outputs sound through the loudspeaker 310.

The loudspeaker 310 reproduces an audio response indicating that the smart speaker 102 is responding and also reproduces sound composited by the cloud server 103. The loudspeaker 310 is a general-purpose device for reproducing sound.

The display controller 311 is connected to the LED 312. The display controller 311 controls light emission of the LED 312 in accordance with an instruction from the CPU 302. In the embodiment, the display controller 311 controls the light emission of the LED 312 to indicate that the smart speaker 102 is obtaining user's voice. The LED 312 is, for example, a blue LED visible to a user. The LED 312 is a general-purpose device. In the embodiment, the smart speaker 102 may be provided with a display device capable of displaying text and picture indicating that the smart speaker 102 is obtaining user's voice instead of the light emission of the LED 312.

Figure 4:
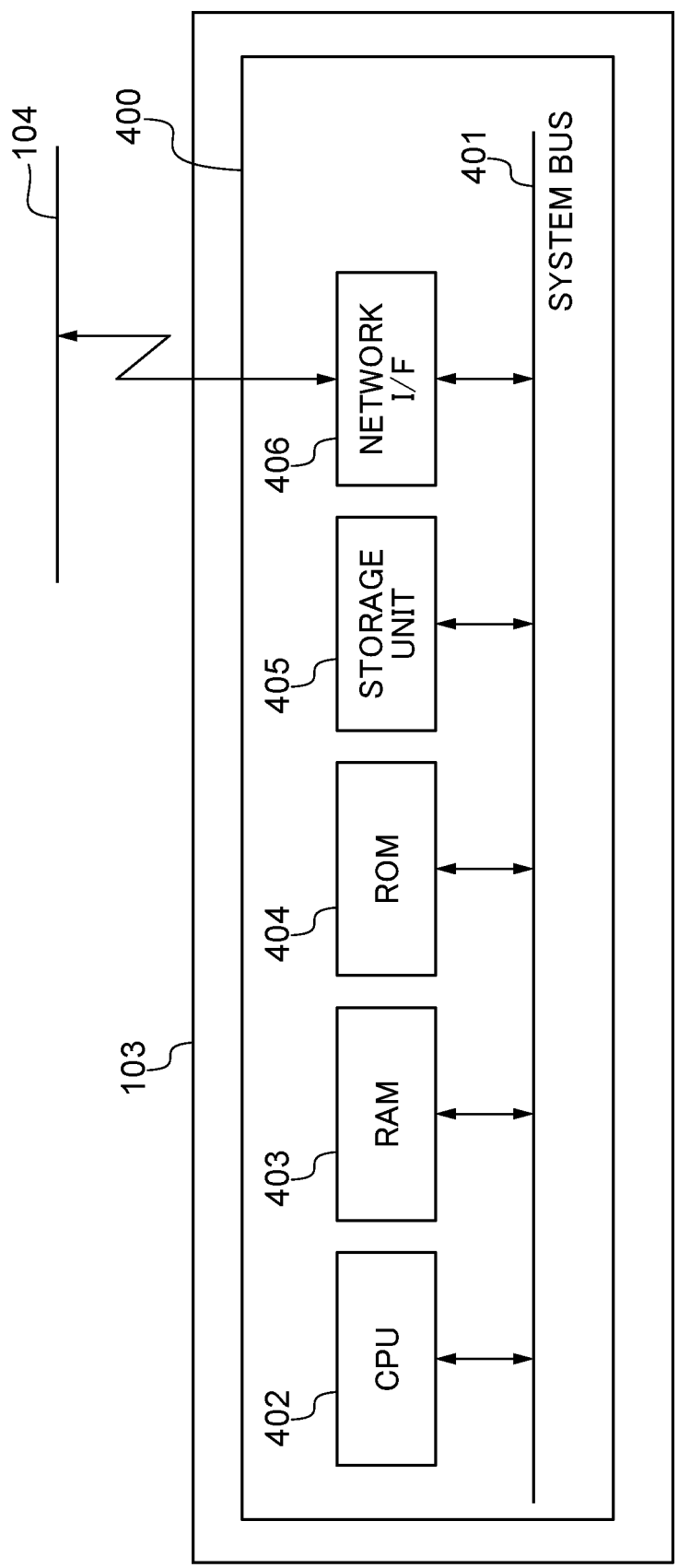
FIG. 4 is a block diagram schematically showing a hardware configuration of a controller of a cloud server in FIG. 1.

FIG. 4 is a block diagram schematically showing a hardware configuration of a controller 400 of the cloud server 103 in FIG. 1. As shown in FIG. 4, the controller 400 is provided with a CPU 402, RAM 403, ROM 404, storage unit 405, and network I/F 406. The CPU 402, RAM 403, ROM 404, storage unit 405, and network I/F 406 are mutually connected through a system bus 401.

The CPU 402 is a central processing unit that controls operations of the entire controller 300. The RAM 403 is a volatile memory. The ROM 404 is a nonvolatile memory and stores a boot program of the CPU 402, etc. The storage unit 405 is a storage device with a larger memory capacity than the RAM 403 and may be a hard disk drive (HDD). It should be noted that the storage unit 405 may be a solid state drive (SSD) or may be another storage device having a function equivalent to that of the HDD. The storage unit 405 stores a control program of the cloud server 103 that the controller 400 executes, for example.

The CPU 402 runs a boot program stored in the ROM 404 when booting the cloud server 103. The boot program reads the control program stored in the storage unit 405 and develops the control program concerned onto the RAM 403. The CPU 402 runs the control program developed onto the RAM 403 and performs various control processes. Moreover, the CPU 402 stores data used when running the control program into the RAM 403 or the storage unit 405. The CPU 402 communicates with another apparatus on the network 104 through the network I/F 406.

Figure 5:
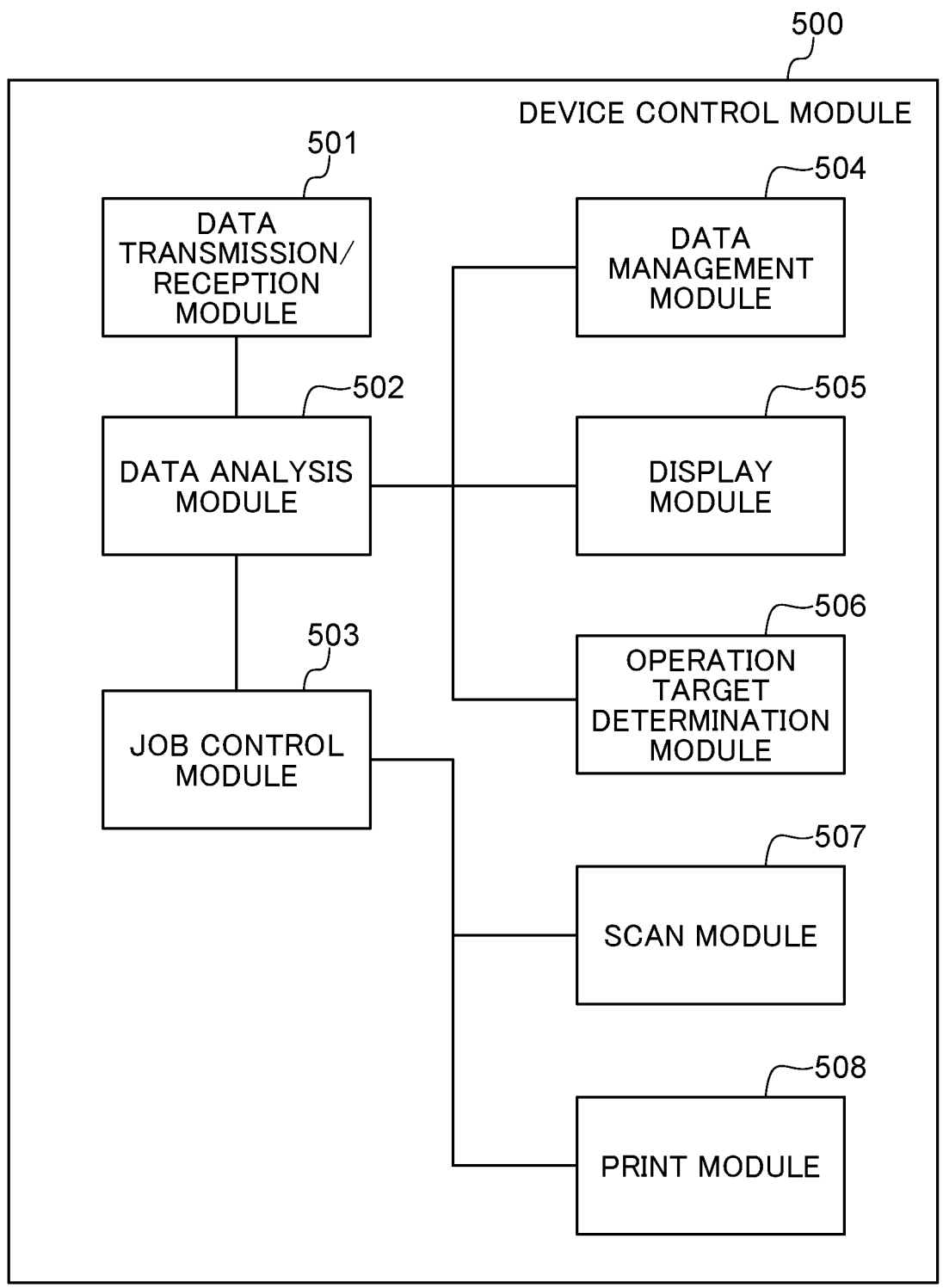
FIG. 5 is a block diagram schematically showing a configuration of a device control module as a software module of the MFP in FIG. 1.

FIG. 5 is a block diagram schematically showing a configuration of a device control module 500 as a software module of the MFP 101 in FIG. 1. As shown in FIG. 5, the device control module 500 includes a data transmission/reception module 501, a data analysis module 502, a job control module 503, a data management module 504, a display module 505, an operation target determination module 506, a scan module 507, and a print module 508. A process executed by these modules is achieved because the CPU 202 runs the control program developed from the ROM 204 to the RAM 203.

The data transmission/reception module 501 controls transmission and reception of data between the MFP 101 and another apparatus on the network 104 through the network I/F 206 in accordance with TCP/IP. For example, the data transmission/reception module 501 controls reception of device operation data that the cloud server 103 generates. Moreover, the data transmission/reception module 501 controls transmission of various notifications from the MFP 101 to the cloud server 103. The various notifications include a notification indicating a job execution result and a notification indicating a job execution status, for example.

The data analysis module 502 converts the device operation data received by the data transmission/reception module 501 into commands that the modules of the device control module 500 can interpret and transmits corresponding commands to the job control module 503, data management module 504, and display module 505.

The job control module 503 gives instructions to the print controller 210 and scan controller 212 to respectively control the print engine 211 and scanner 213. The data management module 504 stores the data about the process by the device control module 500 to predetermined areas of the RAM 203 and storage unit 205 and manages the data. The data about the process by the device control module 500 includes, for example, job data that is a combination of a setting item and set value of a job executed by the job control module 503, and a language setting data that shows a language of texts displayed on the operation panel 209. Moreover, the data management module 504 stores authentication information that is needed for communication with the gateway 105, the device information that is needed for communication with the cloud server 103, etc. into the RAM 203 or the storage unit 205 and manages the information. Furthermore, the data management module 504 stores screen control information that the display module 505 uses for the display control of the screen, and operation target determination information that the operation target determination module 506 uses to determine an operation target. The screen control information and operation target determination information are managed for every screen that the display module 505 displays.

The display module 505 gives an instruction about the display control of the operation panel 209 to the display controller 207. For example, when receiving the instruction from the display module 505, the display controller 207 displays user operatable UI members (buttons, a pulldown list, a check box, etc.) on the operation panel 209. The screen is updated on the basis of the screen control information. For example, the display module 505 obtains a language dictionary corresponding to the language setting data that the data management module 504 manages from the storage unit 205 and displays the text data generated on the basis of the language dictionary on the operation panel 209.

The operation target determination module 506 obtains a coordinate showing a position that a user touches the operation panel 209 through the operation I/F 208 and determines an UI member that is displayed on the operation panel 209 at the position that the user touched as an operation target. The operation target determination module 506 reads the screen control information corresponding to the UI member determined as the operation target and determines the contents of the process on the basis of the screen control information concerned. The operation target determination module 506 instructs the modules of the device control module 500 to execute the determined process. For example, the operation target determination module 506 instructs the display module 505 to update the display contents of the screen and instructs the job control module 503 to start a job using the job parameters set by the user operation.

The scan module 507 controls the scanner 213 to execute a scan through the scan controller 212 on the basis of the scan setting received from the job control module 503 and controls the data management module 504 to store the read image data. The print module 508 controls the print engine 211 to print via the print controller 210 on the basis of the print setting received from the job control module 503.

Figure 6:
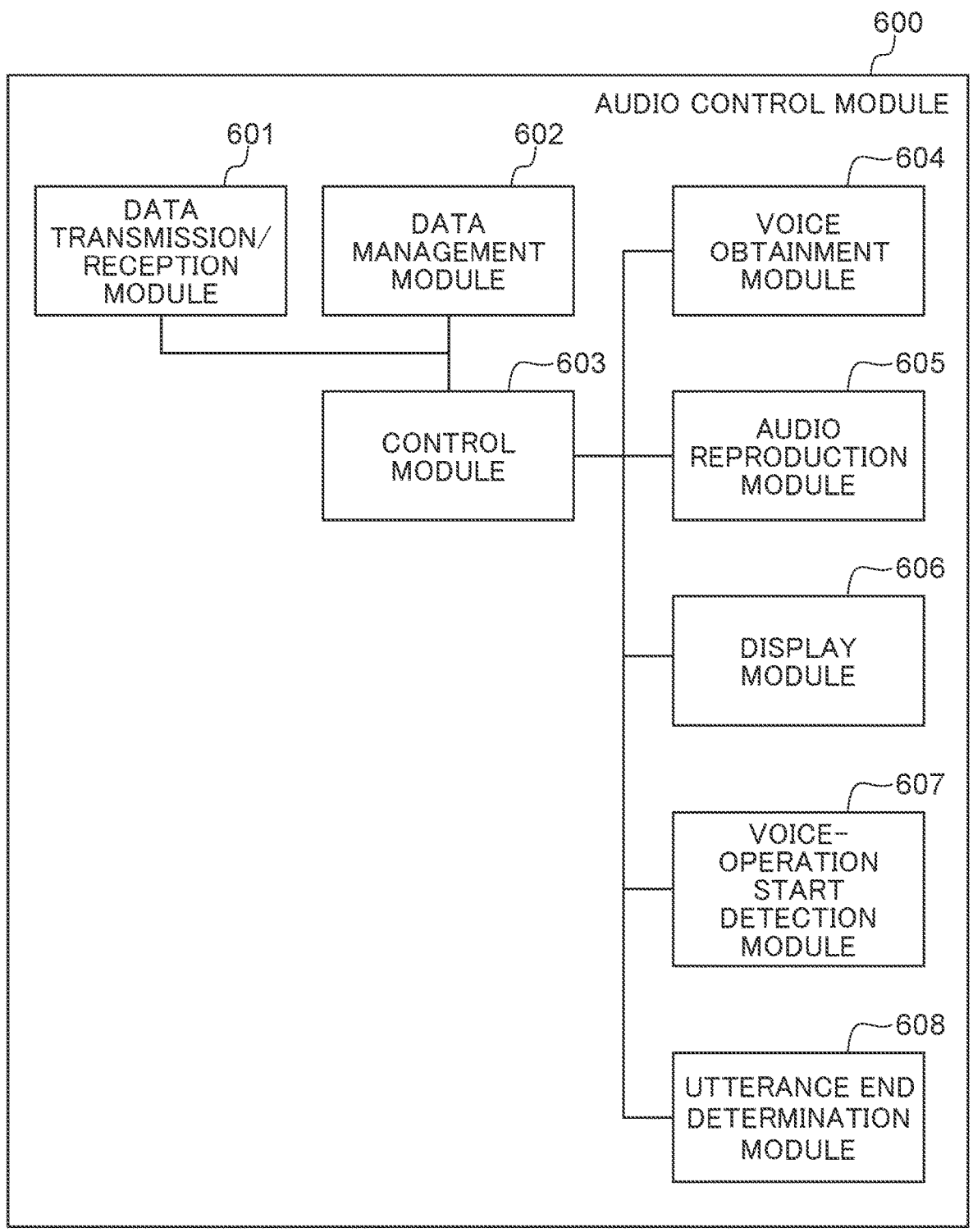
FIG. 6 is a block diagram schematically showing a configuration of an audio control module as a software module of the smart speaker in FIG. 1.

FIG. 6 is a block diagram schematically showing a configuration of an audio control module 600 as a software module of the smart speaker 102 in FIG. 1. As shown in FIG. 6, the audio control module 600 includes a data transmission/reception module 601, a data management module 602, a control module 603, a voice obtainment module 604, an audio reproduction module 605, a display module 606, a voice-operation start detection module 607, and an utterance end determination module 608. A process executed by these modules is achieved because the CPU 302 runs the control program developed from the storage unit 305 to the RAM 303.

The data transmission/reception module 601 controls transmission and reception of data between the smart speaker 102 and another apparatus on the network 104 through the network I/F 306 in accordance with TCP/IP. For example, the data transmission/reception module 601 controls the transmission of audio data of user's voice, which is obtained by the voice obtainment module 604, to the cloud server 103. Moreover, the data transmission/reception module 601 controls the reception of composite audio data (mentioned later) from the cloud server 103.

The data management module 602 stores the data related to the process by the audio control module 600 to a predetermined area of the storage unit 305. The data about the process by the audio control module 600 includes, for example, sound volume setting data of a sound reproduced by the audio reproduction module 605, authentication information that is needed for communication with the gateway 105, and device information that is needed for communication with the MFP 101 and cloud server 103.

The voice obtainment module 604 generates audio data by converting user's analog voice picked up by the microphone 308 into a digital signal in a predetermined format like MP3 and by coding the digital signal and stores the audio data concerned into the RAM 303 temporarily. The control module 603 manages start and end timings of the process by the voice obtainment module 604. It should be noted that the format of the audio data may be a general-purpose streaming format. The coded audio data may be transmitted to the data transmission/reception module 601 subsequently.

The audio reproduction module 605 controls the audio controller 309 to reproduce composite audio data (audio message) received by the data transmission/reception module 601 using the loudspeaker 310. The control module 603 manages an execution timing of the audio reproduction process by the audio reproduction module 605.

The display module 606 controls the light emission of the LED 312 through the display controller 311. For example, when the voice-operation-start detection module 607 detects a voice operation, the display module 606 lights s the LED 312 through the display controller 311. The control module 603 manages an execution timing of the process by the display module 606.

When detecting a wake word that a user utters or a press operation of an operation start key (not shown) of the smart speaker 102, the voice-operation-start detection module 607 transmits an operation start notification showing detection of the wake word or the press operation to the control module 603. The wake word is a voice word for starting the audio assistant function of the smart speaker 102 and is registered beforehand. The voice-operation-start detection module 607 detects the wake word from user's analog voice picked up by the microphone 308. The user can operate the MFP 101 by uttering a phrase corresponding to an instruction after uttering the wake word.

The utterance end determination module 608 determines an end timing of the process of the voice obtainment module 604. For example, the utterance end determination module 608 determines that user's utterance finishes when a pause of user's voice reaches a predetermined period like three seconds. And then, the utterance end determination module 608 transmits the utterance end notification showing the determination result to the control module 603. It should be noted that the end of user's utterance may be determined on the basis of utterance of a predetermined word registered beforehand in place of the no-utterance period (referred to as a "pause period"). For example, when the user utters predetermined words registered beforehand, such as "yes", "no", "OK", "cancel", "finish", "start", and "begin", the utterance end determination module 608 may determine that user's utterance finishes without waiting for the predetermined period. Moreover, not the smart speaker 102 but the cloud server 103 may determine the end of utterance, and the cloud server 103 may determine that the user's utterance finishes on the basis of the meaning and context of contents of user's utterance.

The control module 603 controls the other modules in the audio control module 600 so as to operate in conjunction mutually. Specifically, the control module 603 controls starts and ends of the processes of the voice obtainment module 604, audio reproduction module 605, and display module 606. Moreover, the control module 603 controls the data transmission/reception module 601 to transmit the audio data to the cloud server 103 after the voice obtainment module 604 obtains the audio data. Moreover, the control module 603 controls the audio reproduction module 605 to reproduce composite audio data after receiving the composite audio data from the cloud server 103.

The start and end timings of the processes by the voice obtainment module 604, audio reproduction module 605, and display module 606 will be described.

When the operation start notification is received from the voice-operation-start detection module 607, the control module 603 starts the process by the voice obtainment module 604. Moreover, when receiving the utterance end notification from the utterance end determination module 608, the control module 603 finishes the process by the voice obtainment module 604. For example, when a user utters a wake word, the voice-operation-start detection module 607 detects the wake word and transmits the operation start notification to the control module 603. When receiving the operation start notification, the control module 603 controls the voice obtainment module 604 to start the process. The voice obtainment module 604 obtains user's voice (for example, "I wants to copy") following the wake word, converts the voice into audio data, and stores the audio data temporarily. The utterance end determination module 608 transmits the utterance end notification to the control module 603, when the pause period of the predetermined period continues after the voice of "I wants to copy". When receiving the utterance end notification, the control module 603 controls the voice obtainment module 604 to finish the process. Hereinafter, the state between the start and end of the process by the voice obtainment module 604 will be referred to as an "utterance processing state". The display module 606 lights the LED 312 as a notification to indicate being in the utterance processing state.

After determining that the user's utterance finished, the control module 603 instructs the data transmission/reception module 601 to transmit the audio data that is temporarily stored in the voice obtainment module 604 to the cloud server 103 and waits for a response from the cloud server 103. The response from the cloud server 103 includes, for example, a header section indicating the response and a response message that consists of the composite audio data. The control module 603 controls the audio reproduction module 605 to reproduce the composite audio data when the data transmission/reception module 601 receives the above-mentioned response. The composite audio data is an audio message of "copy screen will be displayed", for example. It should be noted that the state between the determination that the user's utterance finished and the end of reproduction of the composite audio data will be referred to as a "response processing state". The display module 606 blinks the LED 312 as a notification to indicate being in the response processing state.

After finishing reproduction of the composite audio data, the user is able to give an instruction by emitting a phrase corresponding to the instruction without uttering a wake word while the interactive session with the cloud server 103 is continuing. The end of the interactive session is determined when the cloud server 103 transmits an interactive session end notification to the smart speaker 102. The state between the end of one interactive session and the start of another interactive session will be referred to as a "standby state". That is, the smart speaker 102 is in the standby state until the control module 603 receives an operation start notification from the voice-operation-start detection module 607. During the standby state, the display module 606 turns off the LED 312 as a notification to indicate being in the standby state.

Figure 7A:
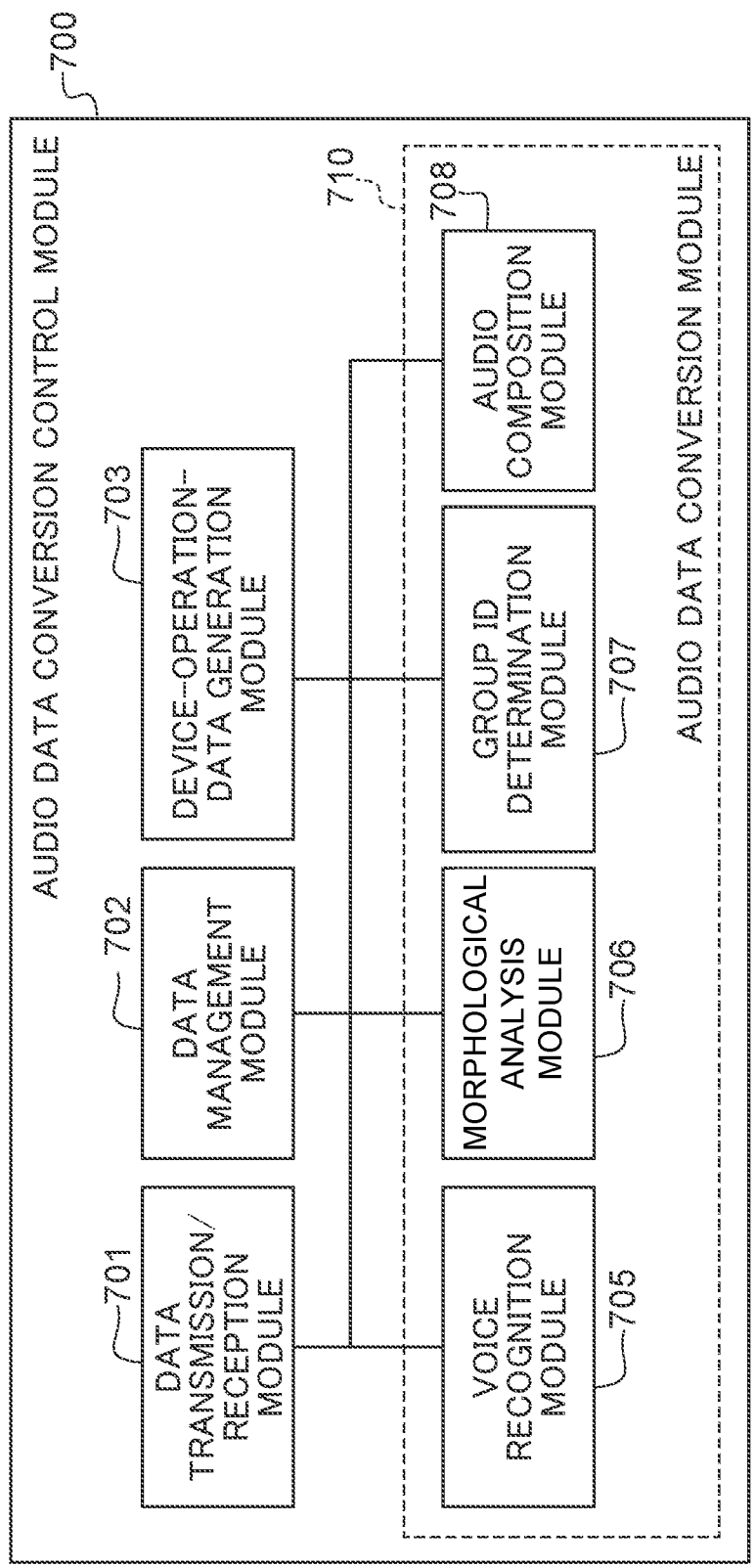

FIG. 7A, FIG. 7B, and FIG. 7C are views for describing an audio data conversion control module as a software module 700 of the cloud server 103 in FIG. 1. FIG. 7A is a block diagram schematically showing a configuration of the audio data conversion control module 700. FIG. 7B shows examples of Japanese group ID lists that are used by a group ID determination module 707 mentioned later for determining a group ID. FIG. 7C shows examples of English group ID lists that are used by the group ID determination module 707 mentioned later for determining a group ID. In the group ID lists, words having the same meaning or intention in relation to user's operations to the MFP 101 are grouped under the same ID. It should be noted that the words listed here are results of the voice recognition of the words that the user utters to the smart speaker 102. Moreover, in the group ID lists, a language determination exception flag that shows whether the language determination mentioned later is excepted is set to each registered word. In the group ID lists, YES is set to the language determination exception flag of a word, such as a "katakana" word like "kopi", that is impossible to specify whether the word is in English or Japanese. The word to which YES is set to the language determination exception flag is not used for the language determination mentioned later. In the meantime, in the group ID lists, NO is set to the language determination exception flag of a word other than a katakana word. The word to which NO is set to the language determination exception flag is used for the language determination mentioned later.

In FIG. 7A, the audio data conversion control module 700 includes a data transmission/reception module 701, a data management module 702, a device-operation-data generation module 703, and an audio data conversion module 710. The audio data conversion module 710 includes a voice recognition module 705, a morphological analysis module 706, a group ID determination module 707, and an audio composition module 708. A process executed by the above-mentioned modules is achieved because the CPU 402 runs the control program developed from the storage unit 405 to the RAM 403.

The data transmission/reception module 701 controls transmission and reception of data between the cloud server 103 and another apparatus on the network 104 through the network I/F 406 in accordance with TCP/IP. For example, the data transmission/reception module 701 receives user's audio data from the smart speaker 102. Moreover, the data transmission/reception module 701 transmits the group ID that the group ID determination module 707 determined and the determination result of the text data by the voice recognition process executed by the voice recognition module 705 to the MFP 101.

The data management module 702 stores the data related to the process of the audio data conversion control module 700 to a predetermined area of the storage unit 405. The data related to the process of the audio data conversion control module 700 include, for example, an acoustic model and language model for converting audio data received by the data transmission/reception module 701 into text data, a dictionary that is used when the morphological analysis module 706 morphologically analyzes a text, the group ID lists that are used when the group ID determination module 707 determines a group ID, an audio database that is used when the audio composition module 708 performs an audio composition process, and device information needed to communicate with the smart speaker 102 or the MFP 101.

The voice recognition module 705 performs the voice recognition process to convert the user's audio data received by the data transmission/reception module 701 into a text. The voice recognition process converts the user's audio data into phonemes using the acoustic model and also converts the phonemes into actual text data using the language model. It should be noted that the user's audio data may include words of several different languages. In the embodiment, the voice recognition process may employ a first voice recognition method that determines a language of input audio data and converts the audio data into text data in the determined language. Moreover, the voice recognition process may employ a second voice recognition method that converts input audio data to phonemes using acoustic models of a plurality of languages and converts the audio data into text data in each of the languages using the corresponding language model. Since the second voice recognition method converts audio data into text data in a plurality of language forms, the voice recognition module 705 generates voice recognition data that consists of a text and a language setting as an execution result of the voice recognition process.

In the embodiment, the languages of input voice are Japanese and English. Voice recognition data in Japanese is data that consists of the language setting "Japanese" and a text consisting of one or more kana. Voice recognition data in English is data that consists of the language setting "English" and a text consisting of one or more alphabet. It should be noted that the voice recognition process that converts audio data into voice recognition data is not restricted to the method mentioned above in the embodiment, and another method may be used.

The morphological analysis module 706 morphologically analyzes the voice recognition data converted by the voice recognition module 705 on the basis of the language setting. The morphological analysis module 706 deduces a morpheme string from a dictionary having information about grammar and parts of speech of the language and determines the part of speech of each morpheme (word information) that constitutes the morpheme string concerned. The morphological analysis module 706 can be achieved by using a well-known morphological analysis software, such as JUMAN, Web-Chamame, or MeCab.

An operation example of the morphological analysis module 706 will be described. For example, the morphological analysis module 706 analyzes voice recognition data {"yonbukopishite (four copies)", the language setting "Japanese"} that is converted by the voice recognition module 705 as a morpheme string of "yon", "bu", "kopi", "wo", and "shite" Moreover, the morphological analysis module 706 analyzes voice recognition data {"Four Copies", the language setting "English"} as a morpheme string of "Four" and "Copies".

The group ID determination module 707 specifies group IDs by matching the result of the morphological analysis by the morphological analysis module 706 with the group ID lists corresponding to the language setting of the voice recognition data among the Japanese group ID lists in FIG. 7B and the English group ID lists in FIG. 7C. And then the group ID determination module 707 generates a group ID determination result indicating the specified group IDs. For example, the group ID determination module 707 matches the morpheme string of "yon", "bu", "kopi", "wo", and "shite" with the Japanese group ID lists in FIG. 7B, specifies "NUM00004", "CNF00001", and "FNC00001" that are the group IDs of "yon", "bu", and "kopi", and generates {ID: NUM00004, ID:CNF00001, ID:FNC00001} as the group ID determination result. Moreover, the group ID determination module 707 matches the morpheme string of "Four" and "Copies" with the English group ID lists in FIG. 7C, specifies "NUM00004", "CNF00001", and "FNC00001" that are the group IDs of "Four" and "Copies", and generates {ID:NUM00004, ID:CNF00001, ID:FNC00001} as the group ID determination result.

When the group ID determination result includes a plurality of group IDs, the group IDs are set up in the order of the results of the voice recognition and the morphological analysis. For example, when the results of the voice recognition and the morphological analysis are "yon", "bu", "kopi", "wo", and "shite", the group IDs are set up in the order of {ID:NUM00004, ID:CNF00001, ID:FNC00001} corresponding to the morphemes "yon", "bu", and "kopi" as the group ID determination result. Moreover, when there are different group IDs corresponding to the same morpheme, the group ID determination result may include all the different group IDs. For example, "CNF00001" and "FNC00001" are associated with the same morpheme "copies" in the English group ID lists in FIG. 7C. When the results of the voice recognition and the morphological analysis are "four" and "copies", the group ID determination result is generated as {ID:NUM00004, ID:CNF00001, ID:FNC00001}.

The audio composition module 708 performs an audio composition process on the basis of the notification received from the MFP 101. In the audio composition process, a previously registered text that corresponds to the received notification is converted into audio data of a predetermined format, such as MP3. In the audio composition process, the audio data is generated on the basis of an audio database stored in the data management module 702, for example. The audio database is, for example, a database that collects sounds of regular contents like words. Although the audio composition process is performed using the audio database in the embodiment, the method of the audio composition process is not restricted to this method. Another method may be used.

The device-operation-data generation module 703 determines the operation of the MFP 101 on the basis of the group ID determination result generated by the group ID determination module 707 and the language setting of the voice recognition data generated by the voice recognition module 705. The device-operation-data generation module 703 generates a file of a predetermined data format corresponding to the determined operation.

For example, when the language setting of the voice recognition data is "Japanese" and the group ID determination result is {ID:NUM00004, ID:CNF00001, ID:FNC00001}, the device-operation-data generation module 703 determines that Japanese is set to the language setting of the MFP 101 on the basis of the "Japanese" and generates a character string {"language": "Japanese"}. The device-operation-data generation module 703 determines to instruct the MFP 101 to perform a copy job on the basis of "FNC00001" and generates character strings {"operation": "jobStart"} and {"jobName": "copy"} for performing the copy job. The device-operation-data generation module 703 generates a character string {"copies": "4"} for designating "4" as the number of copies of the copy job on the basis of "NUM00004" and "CNF00001". The device-operation-data generation module 703 generates the data in the JSON format shown in FIG. 8 by combining these character strings.

Moreover, when the language setting of the voice recognition data is "English" and the group ID determination result is {ID:FNC00001, ID:NUM00004, ID:CNF00002, ID:FNC00003}, the device-operation-data generation module 703 determines that English is set to the language setting of the MFP 101 on the basis of the "English" and generates a character string {"language": "English"}. The device-operation-data generation module 703 determines to execute the job setting of the MFP 101 on the basis of "FNC00001" and "FNC00003" and generates a character string {"operation": "jobSetting"} for executing the job setting. The device-operation-data generation module 703 generates a character string {"density": "4"} on the basis of "NUM00004" and "CNF00001". The device-operation-data generation module 703 generates the data in the JSON format shown in FIG. 9 by combining these character strings.

Figure 10:
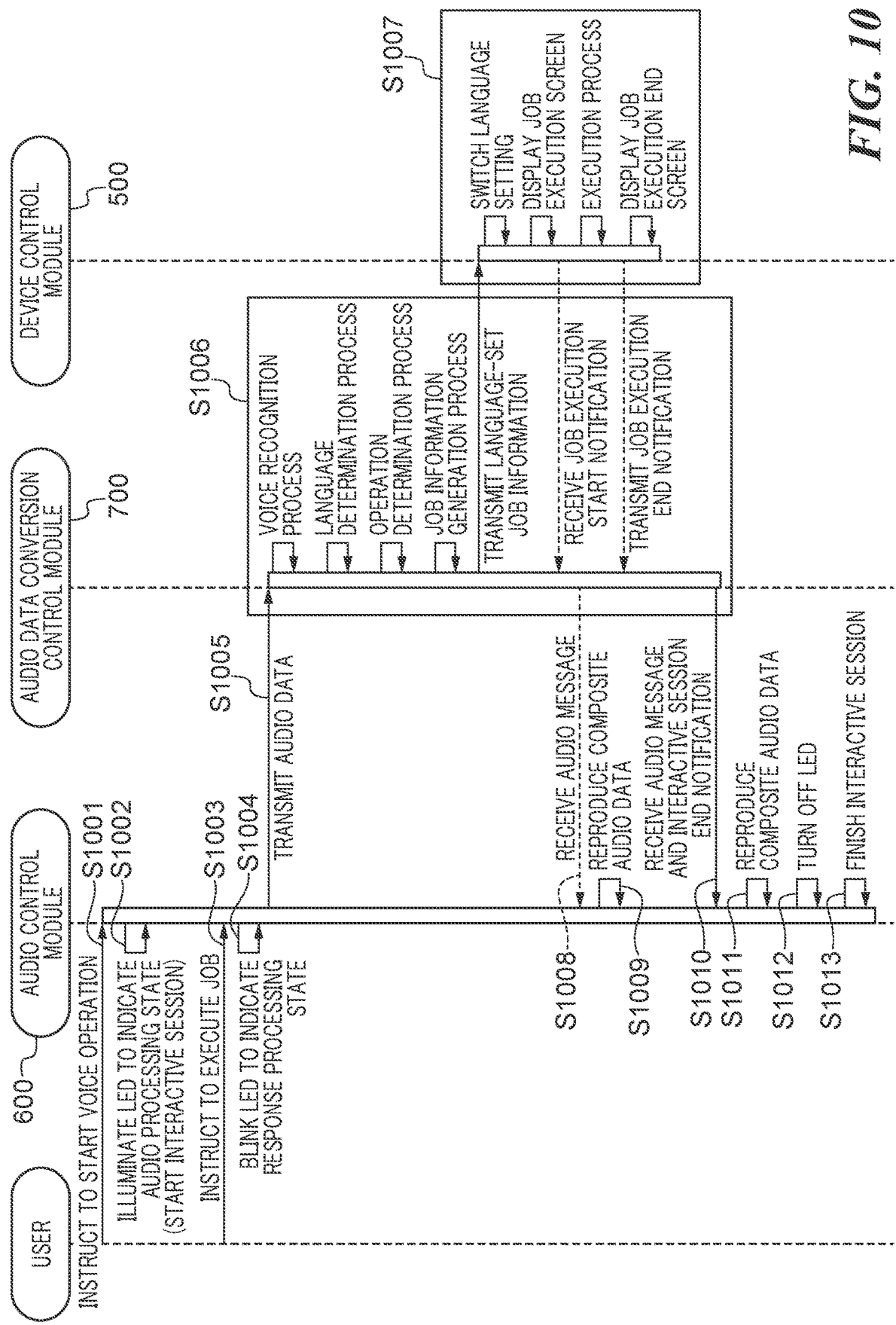
FIG. 10 is a sequence chart showing procedures of a process executed when the image forming system in FIG. 1 receives a job execution instruction by a voice input.

FIG. 10 is a sequence chart showing procedures of a process executed when the image forming system 100 of FIG. 1 receives a job execution instruction by voice input. It should be noted that the smart speaker 102, MFP 101, and cloud server 103 shall be communicable mutually in FIG. 10. Moreover, a home screen 2001 in FIG. 20 on which functions, such as copy, scan, and print, can be called shall be displayed on the operation panel 209 of the MFP 101.

In FIG. 10, a user gives an instruction to the smart speaker 102 to start a voice operation to in a step S1001 first. The instruction to start the voice operation is given when a user utters the wake word or when the user presses an operation start key (not shown) of the smart speaker 102. The instruction to start the voice operation is detected by the voice-operation-start detection module 607.

When the instruction to start the voice operation is detected, the display module 606 of the audio control module 600 lights the LED 312 as a notification to indicate being in the utterance processing state in a step S1002 in the smart speaker 102. Moreover, the process by the voice obtainment module 604 is started in the smart speaker 102.

In a step S1003, the user performs the function call instruction to the smart speaker 102. For example, the user utters a phrase, such as "yonbukopishite" or "four copies", that is a job execution instruction as a function call instruction following the wake word detected in the step S1001. Audio data is generated on the basis of user's voice that is obtained by the voice obtainment module 604. When the pause period of the predetermined period continues, the utterance end determination module 608 determines that the utterance ends.

In a step S1004, the display module 606 of the audio control module 600 blinks the LED 312 as a notification to indicate being in the response processing state depending on the utterance end determination. Moreover, the process by the voice obtainment module 604 is completed. In a step S1005, the data transmission/reception module 601 transmits the generated audio data to the cloud server 103.

In a step S1006, the audio data conversion control module 700 in the cloud server 103 executes the voice-operation-service execution process of FIG. 11 mentioned later. The details of the voice-operation-service execution process will be mentioned later. In the voice-operation-service execution process, the language-set job information that is device operation data for executing a job is transmitted to the MFP 101, and the audio message mentioned later is transmitted to the smart speaker 102, for example.

In a step S1007, the device control module 500 in the MFP 101 executes a language setting switching process of FIG. 19 mentioned later on the basis of the language-set job information received from the cloud server 103.

In a step S1008, the data transmission/reception module 601 in the smart speaker 102 receives an audio message from the cloud server 103. In the next step S1009, the audio reproduction module 605 reproduces the composite audio data into which the audio message received in the step S1008 is converted. For example, the audio reproduction module 605 reproduces the composite audio data "copy will be started" through the loudspeaker 310.

In a step S1010, the data transmission/reception module 601 receives an audio message that is different from the audio message received in the step S1008 from the cloud server 103. Moreover, the data transmission/reception module 601 receives the interactive session end notification that finishes then interactive session with the user from the cloud server 103.

In a step S1011, the audio reproduction module 605 reproduces the composite audio data into which the audio message received in the step S1010 is converted. For example, the audio reproduction module 605 reproduces the composite audio data "copy has been finished" through the loudspeaker 310.

In a step S1012, the display module 606 turns off the LED 312 as a notification showing that the smart speaker 102 is in the standby state in response to the reception of the interactive session end notification by the data transmission/reception module 601 in the step S1010.

In a step S1013, the audio control module 600 finishes the interactive session and shifts the smart speaker 102 to the standby state in response to the reception of the interactive session end notification by the data transmission/reception module 601 in the step S1010.

In the sequence of FIG. 10, even if the LED 312 is blinking as the notification to indicate being in the response processing state, the user can input a wake word into the smart speaker 102. The interactive session may be compulsorily finished when the user utters "cancel" or "stop" after a wake word.

Figure 11:
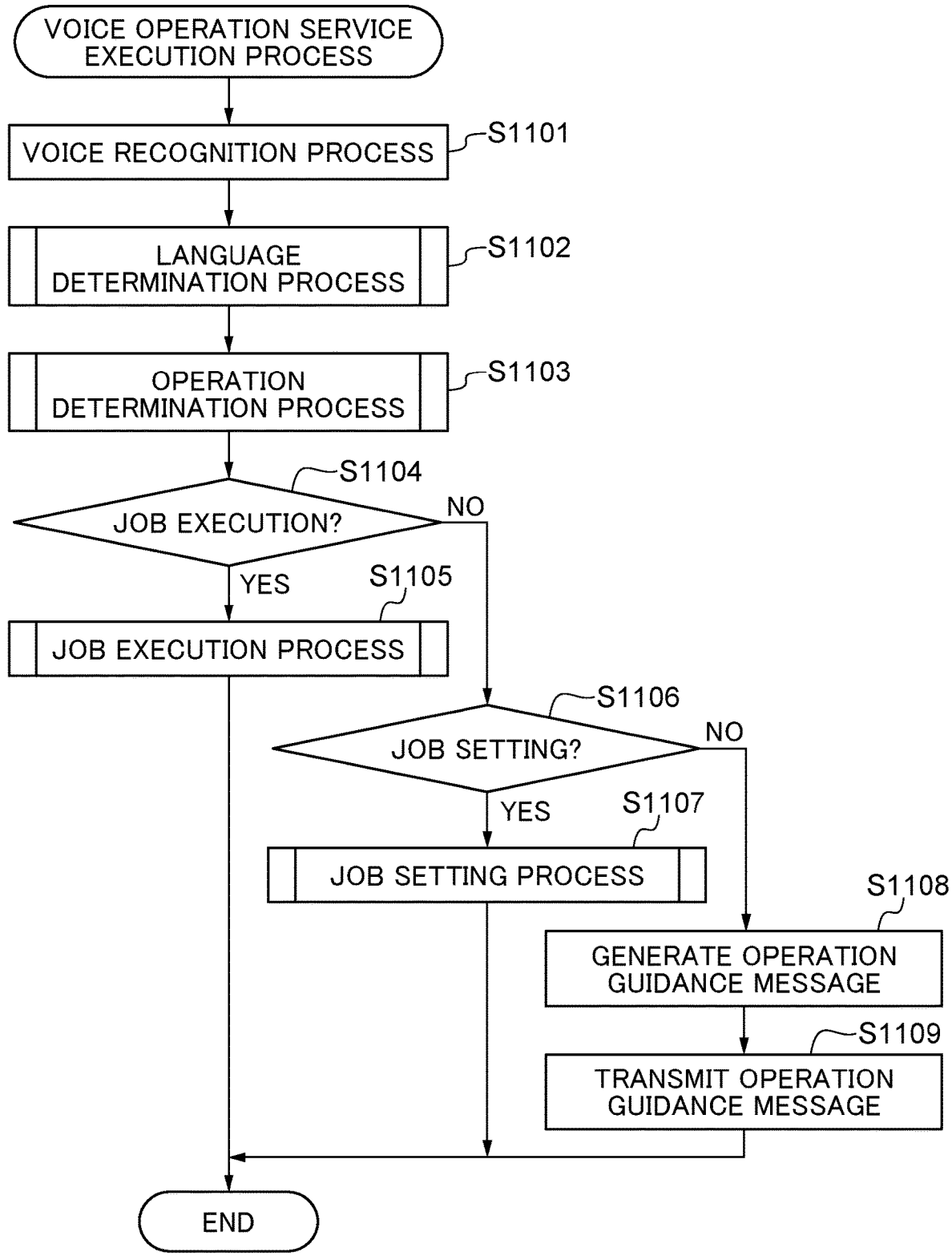
FIG. 11 is a flowchart showing procedures of a voice-operation-service execution process executed by the cloud server in FIG. 1.

FIG. 11 is a flowchart showing procedures of the voice-operation-service execution process executed by the cloud server 103 in FIG. 1. The voice-operation-service execution process is achieved because the CPU 402 runs the control program developed from the storage unit 405 to the RAM 403. The voice-operation-service execution process of FIG. 11 is executed when the data transmission/reception module 701 receives, in the step S1005, the audio data of the function call instruction transmitted from the smart speaker 102.

As shown in FIG. 11, the CPU 402 executes the voice recognition process that converts audio data into text data by the voice recognition module 705 (a step S1101). In the voice recognition process, the voice recognition module 705 may employ the first voice recognition method that determines a language of input audio data and converts the audio data into text data in the determined language as mentioned above. Moreover, the voice recognition module 705 may employ the second voice recognition method that converts input audio data to phonemes using acoustic models of a plurality of languages and converts the audio data into text data in each of the languages using the corresponding language model.

Next, the CPU 402 executes a language determination process on the basis of the text data converted in the step S1101 and the language determination result (a step S1102). It should be noted that the contents of the language determination process of the step S1102 differ on the basis of the method (the first voice recognition method or the second voice recognition method) used for conversion of the text data in the step S1101. For example, when the first voice recognition method is used for conversion of the text data in the step S1101, the CPU 402 executes a first language determination process of FIG. 12 mentioned later. In the meantime, when the second voice recognition method is used for conversion of the text data in the step S1101, the CPU 402 executes a second language determination process of FIG. 13 mentioned later.

Next, the CPU 402 executes an operation determination process of FIG. 14 mentioned later (a step S1103) and stores the operation information that is the determination result of the type of the user's function call instruction into the RAM 403. Next, the CPU 402 determines whether the operation information stored in the RAM 403 is "job execution" (a step S1104).

As a result of the determination in the step S1104, when the operation information is "job execution", the CPU 402 executes the job execution process of FIG. 15 mentioned later (a step S1105) and finishes the voice-operation-service execution process. As a result of the determination in the step S1104, when the operation information is not "job execution", the CPU 402 determines whether operation information is "job setting" (a step S1106).

As a result of the determination in the step S1106, when the operation information is "job setting", the CPU 402 executes a job setting process of FIG. 23 mentioned later (a step S1107) and finishes the voice-operation-service execution process. As a result of the determination in the step S1106, when the operation information is not "job setting", the CPU 402 generates an operation guide message that is a text message for urging the input of an operation key word (a step S1108). And then, the CPU 402 stores the operation guide message into the audio data storage area in the RAM 403. The operation guide message is "Please give an operation of COPY, EMAILSEND, or the like that you want to execute.", for example. Next, the CPU 402 controls the data transmission/reception module 701 to transmit the operation guide message stored in the RAM 403 through the network I/F 406 to the smart speaker 102 (a step S1109) and finishes the voice-operation-service execution process.

Figure 12:
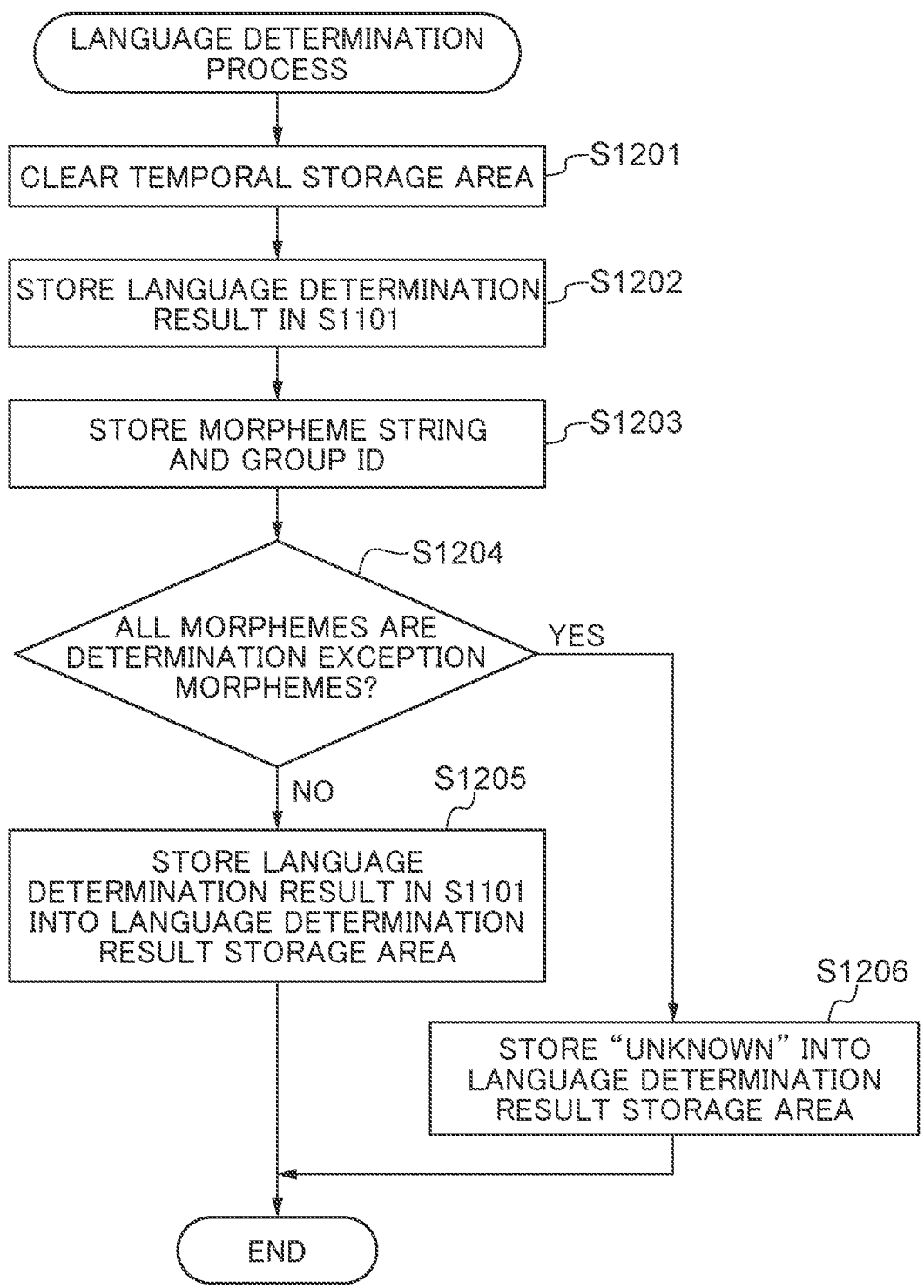
FIG. 12 is a flowchart showing procedures of a language determination process of a step S1102 when a first voice recognition method is used for conversion of text data in a step S1101 in FIG. 11.

FIG. 12 is a flowchart showing procedures of the first language determination process executed in the step S1102 when the first voice recognition method is used for conversion of text data in the step S1101 in FIG. 11.

As shown in FIG. 12, the CPU 402 clears a temporary storage area that is a part of the storage area of the RAM 403 (a step S1201). The temporary storage area is a storage area used in the first language determination process, for example, includes a language-determination-result temporary storage area, a morpheme string storage area, a group ID storage area, and a language-determination-result storage area. Next, the CPU 402 stores the language determination result of the audio data performed in the voice recognition process in the step S1101 into the language-determination-result temporary storage area of the RAM 403 (a step S1202). Next, the CPU 402 analyzes the above-mentioned text data by the morphological analysis module 706 to extract a morpheme string corresponding to the determined language stored in the language-determination-result temporary storage area and converts the morphemes that constitute the morpheme string into group IDs by the group ID determination module 707. Next, the CPU 402 stores the morpheme string in the morpheme string storage area and stores the group IDs in the group ID storage area (a step S1203).

Next, the CPU 402 obtains the language determination exception flag of each of the morphemes that constitute the above-mentioned morpheme string from the group ID lists 711, 722, and 713 in FIG. 7B and the group ID lists 721, 722, and 723 in FIG. 7C. The CPU 402 determines that a morpheme of which the language determination exception flag is "YES" is a determination exception morpheme (language-specification-impossible-word information). The CPU 402 determines whether all the morphemes that constitute the morpheme string are the determination exception morphemes (a step S1204).

As a result of the determination in the step S1204, when at least one morpheme is not the determination exception morpheme, the CPU 402 stores the language determination result stored in the language-determination-result temporary storage area into the language-determination-result storage area (a step S1205). The language determination result stored in the language-determination-result temporary storage area is the language determination result of the audio data obtained in the voice recognition process of the step S1101. After that, the language determination process is finished.

As a result of the determination in the step S1204, when all the morphemes are the determination exception morphemes, the CPU 402 stores "unknown" showing that the language determination is impossible into the language-determination-result storage area (a step S1206). After that, the language determination process is finished.

Figure 13:
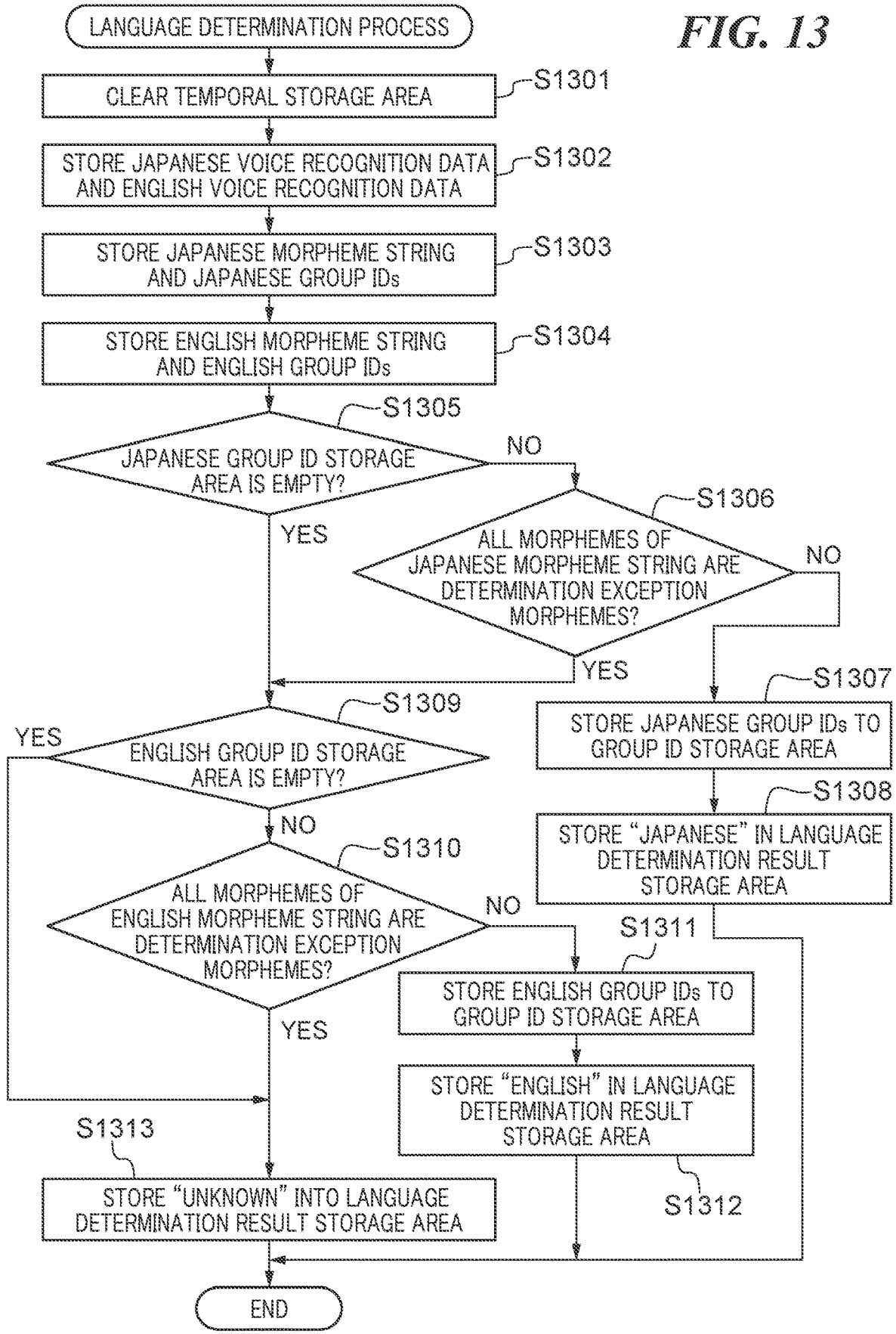
FIG. 13 is a flowchart showing procedures of a language determination process of the step S1102 when a second voice recognition method is used for conversion of text data in the step S1101 in FIG. 11.

FIG. 13 is a flowchart showing procedures of the second language determination process executed in the step S1102 when the second voice recognition method is used for conversion of text data in the step S1101 in FIG. 11.

As shown in FIG. 13, the CPU 402 clears a temporary storage area that is a part of the storage area of the RAM 403 (a step S1301). The temporary storage area is used in the second language determination process and includes a Japanese-voice-recognition-data storage area, an English-voice-recognition-data storage area, a Japanese morpheme string storage area, a Japanese group ID storage area, an English-morpheme-string storage area, an English group ID storage area, a language-determination-result storage area, and a group ID storage area.

Next, the CPU 402 stores voice recognition data (hereinafter referred to as "Japanese voice recognition data") that includes the language setting "Japanese" into the Japanese-voice-recognition-data storage area. The Japanese voice recognition data includes the text data that is obtained because the voice recognition module 705 applies the voice recognition process to the audio data in Japanese (a step S1302). Moreover, the CPU 402 stores voice recognition data (hereinafter referred to as "English voice recognition data") that includes the language setting "English" into the English-voice-recognition-data storage area. The English voice recognition data includes the text data that is obtained because the voice recognition module 705 applies the voice recognition process to the audio data in English (the step S1302).

Next, the CPU 402 analyzes the text data included in the Japanese voice recognition data by the morphological analysis module 706 to extract a morpheme string corresponding to Japanese and converts the morphemes that constitute the morpheme string into group IDs by the group ID determination module 707. The CPU 402 stores the morpheme string (hereinafter referred to as a "Japanese morpheme string") in the Japanese morpheme string storage area and stores the group IDs (hereinafter referred to as "Japanese group IDs") in the Japanese group ID storage area (a step S1303).

Next, the CPU 402 analyzes the text data included in the English voice recognition data by the morphological analysis module 706 to extract a morpheme string corresponding to English and converts the morphemes that constitute the morpheme string into group IDs by the group ID determination module 707. The CPU 402 stores the morpheme string (hereinafter referred to as an "English morpheme string") in the English morpheme string storage area and stores the group IDs (hereinafter referred to as "English group IDs") in the English group ID storage area (a step S1304).

Next, the CPU 402 determines whether the Japanese group ID storage area is empty (a step S1305). In the step S1305, when no group ID is stored in the Japanese group ID storage area, the CPU 402 determines that the Japanese group ID storage area is empty. In the meantime, when at least one group ID is stored in the Japanese group ID storage area, the CPU 402 determines that the Japanese group ID storage area is not empty.

As a result of the determination in the step S1305, when the Japanese group ID storage area is not empty, the CPU 402 obtains the language determination exception flags of the morphemes that constitutes the Japanese morpheme string from the group ID lists 711, 712, and 713 in FIG. 7B. The CPU 402 determines whether all the morphemes that constitute the Japanese morpheme string are the determination exception morphemes (a step S1306).

As a result of the determination in the step S1306, when at least one morpheme that constitutes the Japanese morpheme string is not the determination exception morpheme, the CPU 402 stores the group IDs stored in the Japanese group ID storage area to the group ID storage area (a step S1307). It should be noted that a group ID stored in the Japanese group ID storage area is a Japanese group ID. Next, the CPU 402 stores the language setting "Japanese" in the language-determination-result storage area (a step S1308). After that, the language determination process is finished.

When all the morphemes that constitute the Japanese morpheme string are the determination exception morphemes as a result of the determination in the step S1306 or when the Japanese group ID storage area is empty as a result of the determination in the step S1305, the CPU 402 determines whether the English group ID storage area is empty (a step S1309).

As a result of the determination in the step S1309, when the English group ID storage area is not empty, the CPU 402 obtains the language determination exception flags of the morphemes that constitutes the English morpheme string from the group ID lists 721, 722, and 723 in FIG. 7C. The CPU 402 determines whether all the morphemes that constitute the English morpheme string are the determination exception morphemes (a step S1310).

As a result of the determination in the step S1310, when at least one morpheme that constitutes the English morpheme string is not the determination exception morpheme, the CPU 402 stores the group IDs stored in the English group ID storage area to the group ID storage area (a step S1311). It should be noted that a group ID stored in the English group ID storage area is an English group ID. Next, the CPU 402 stores the language setting "English" in the language-determination-result storage area (a step S1312). After that, the language determination process is finished.

When all the morphemes that constitute the English morpheme string are the determination exception morphemes as a result of the determination in the step S1310 or when the English group ID storage area is empty as a result of the determination in the step S1309, the CPU 402 stores "unknown" showing that the language determination is impossible into the language-determination-result storage area (a step S1313). After that, the language determination process is finished. In this embodiment, when a phrase that a user utters consists of only determination exception morphemes, such as "kopi", "copy", "kopisetteingu", and "copy setting", as shown in FIG. 30, "unknown" is stored in the language-determination-result storage area in this way. Moreover, when the user utters phrases, such as "yonbukopishite", "noudosetteiyon", "four copies", and "set density four", that include morphemes other than the determination exception morphemes (other than the language-specification-impossible-word information), "English" or "Japanese" is stored in the language-determination-result storage area.

Figure 14:
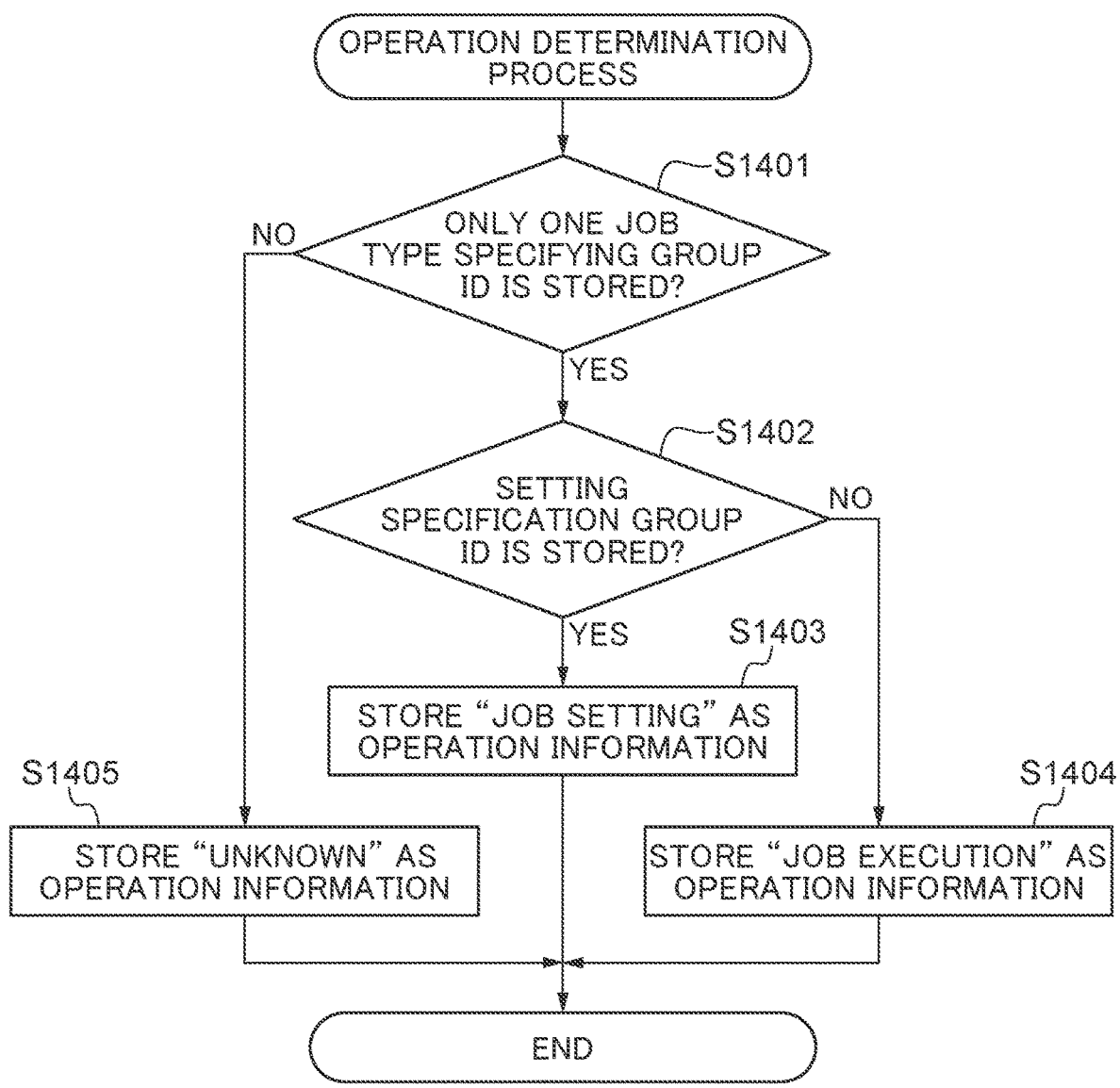
FIG. 14 is a flowchart showing procedures of an operation determination process of a step S1103 in FIG. 11.

FIG. 14 is a flowchart showing procedures of the operation determination process of the step S1103 in FIG. 11.

As shown in FIG. 14, the CPU 402 determines whether only one group ID (hereinafter referred to as a "job type specifying group ID") that specifies the job type is stored in the group ID storage area of the RAM 403 (a step S1401). The job type specifying group IDs are, for example, "FNC00001" corresponding to the job type "COPY" and "FNC00004" corresponding to the job type "EMAILSEND".

As a result of the determination in the step S1401, when only one job type specifying group ID is stored in the group ID storage area, the CPU 402 determines whether a group ID (hereinafter referred to as a "setting specification group ID") that specifies "setting" is stored in the group ID storage area (a step S1402). The setting specification group ID is "FNC00003" corresponding to "setting", for example.

As a result of the determination in the step S1402, when the setting specification group ID is stored in the group ID storage area, the CPU 402 stores "job setting" showing that the type of the user's function call instruction is "setting" into the RAM 403 as the operation information (a step S1403), and the operation determination process is finished.

As a result of the determination in the step S1402, when no setting specification group ID is stored in the group ID storage area, the CPU 402 stores "job execution" showing that the type of the user's function call instruction is "execution of a job" into the RAM 403 as the operation information (a step S1404), and the operation determination process is finished.

As a result of the determination in the step S1401, when a plurality of job type specifying group IDs are stored in the group ID storage area or when no job type specifying group ID is stored in the group ID storage area, the CPU 402 stores "unknown" showing that the type of the user's function call instruction is unknown into the RAM 403 as the operation information (a step S1405), and the operation determination process is finished.

Figure 15:
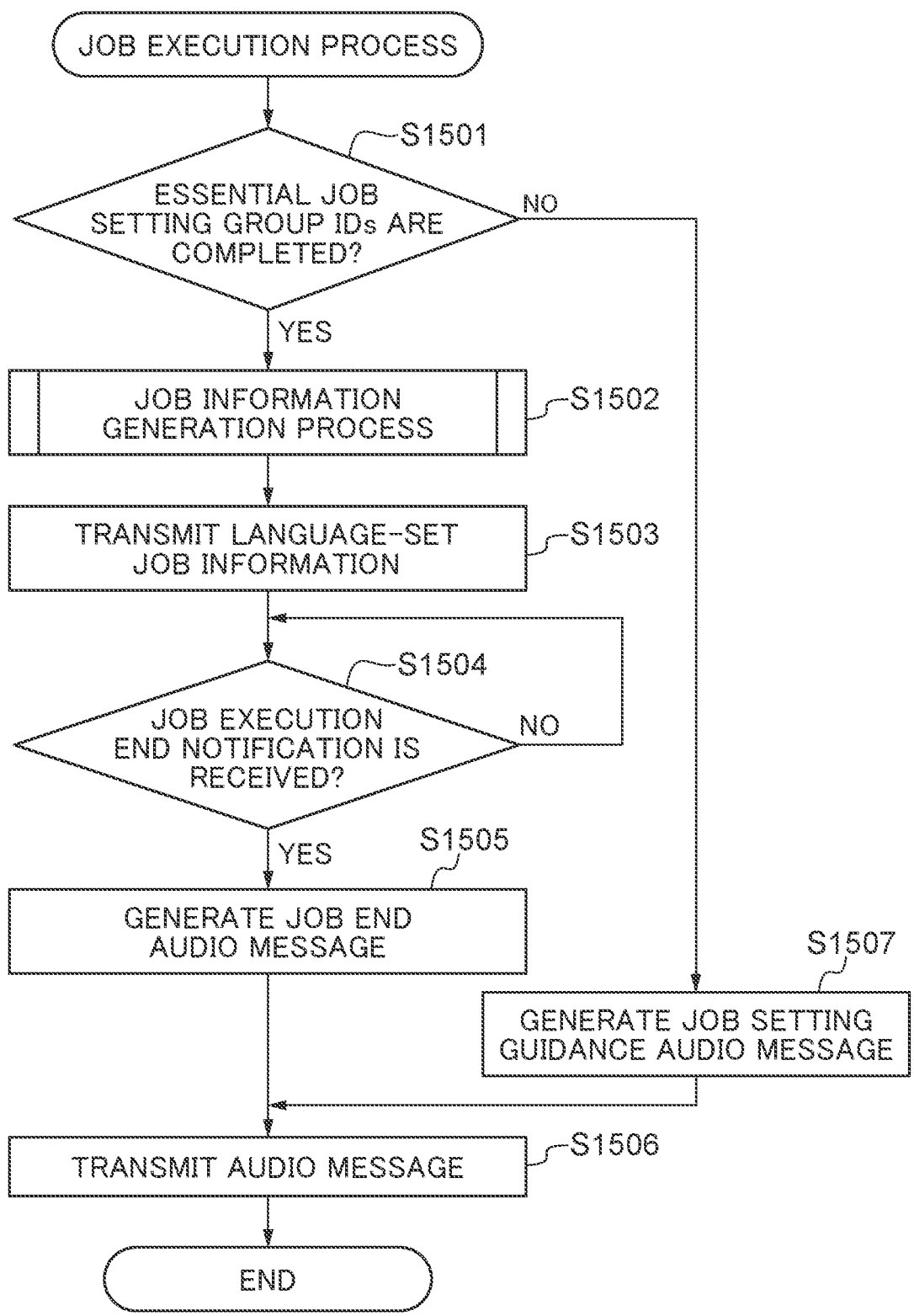
FIG. 15 is a flowchart showing procedures of a job execution process of a step S1105 in FIG. 11.

FIG. 15 is a flowchart showing procedures of the job execution process of the step S1105 in FIG. 11.

As shown in FIG. 15, the CPU 402 determines whether essential job setting group IDs are completed in the group ID storage area of the RAM 403 (a step S1501). An essential job setting group ID is a group ID corresponding to a setting that a user has to set up to execute a job. For example, the essential job setting group ID of the job type "EMAILSEND" is "CNF00004" that shows a destination. The essential job setting group IDs differ depending on the job type. There is a job type that has no essential job setting group ID and there is a job type that has a plurality of essential job setting group IDs.

As a result of the determination in the step S1501, when the essential job setting group IDs are completed in the group ID storage area, the CPU 402 executes a job information generation process of FIG. 16 mentioned later (a step S1502) to generate the language-set job information that is a device operation data for executing the job by the MFP 101. Next, the CPU 402 transmits the language-set job information concerned to the MFP 101 through the network I/F 406 (a step S1503). Next, the CPU 402 determines whether the job-execution end notification is received from the MFP 101 (a step S1504). In the embodiment, when the job is completed or when the job is suspended due to occurrence of an error, the MFP 101 transmits the job-execution end notification including the information that indicates such a job end state to the cloud server 103. The CPU 402 waits until receiving the job-execution end notification from the MFP 101. When the job-execution end notification is received from the MFP 101 (YES in the step S1504), the CPU 402 generates a job end audio message that is a text message corresponding to the received job-execution end notification (a step S1505). In the step S1505, "Job has been completed" that is a message at a time of normal end or "End due to error" that is a message at a time of occurrence of paper jam or an error in the MFP 101 are generated, for example.

Next, the CPU 402 stores the job end audio message concerned in the audio message storage area in the RAM 403. Next, the CPU 402 transmits the audio message stored in the audio message storage area to the smart speaker 102 through the network I/F 406 (a step S1506) and finishes the job execution process.

As a result of the determination in the step S1501, when the essential job setting group IDs are not completed in the group ID storage area, the CPU 402 generates a job-setting-guidance audio message (a step S1507). The job-setting-guidance audio message is a text message to urge the input of settings that is needed for execution of a job. For example, when no destination is designated in a state where the user has designated "EMAILSEND", the job-setting-guidance audio message "Please input a transmission destination" is generated. The CPU 402 stores the generated job-setting-guidance audio message in the audio message storage area and executes the process of the step S1506.

Figure 16:
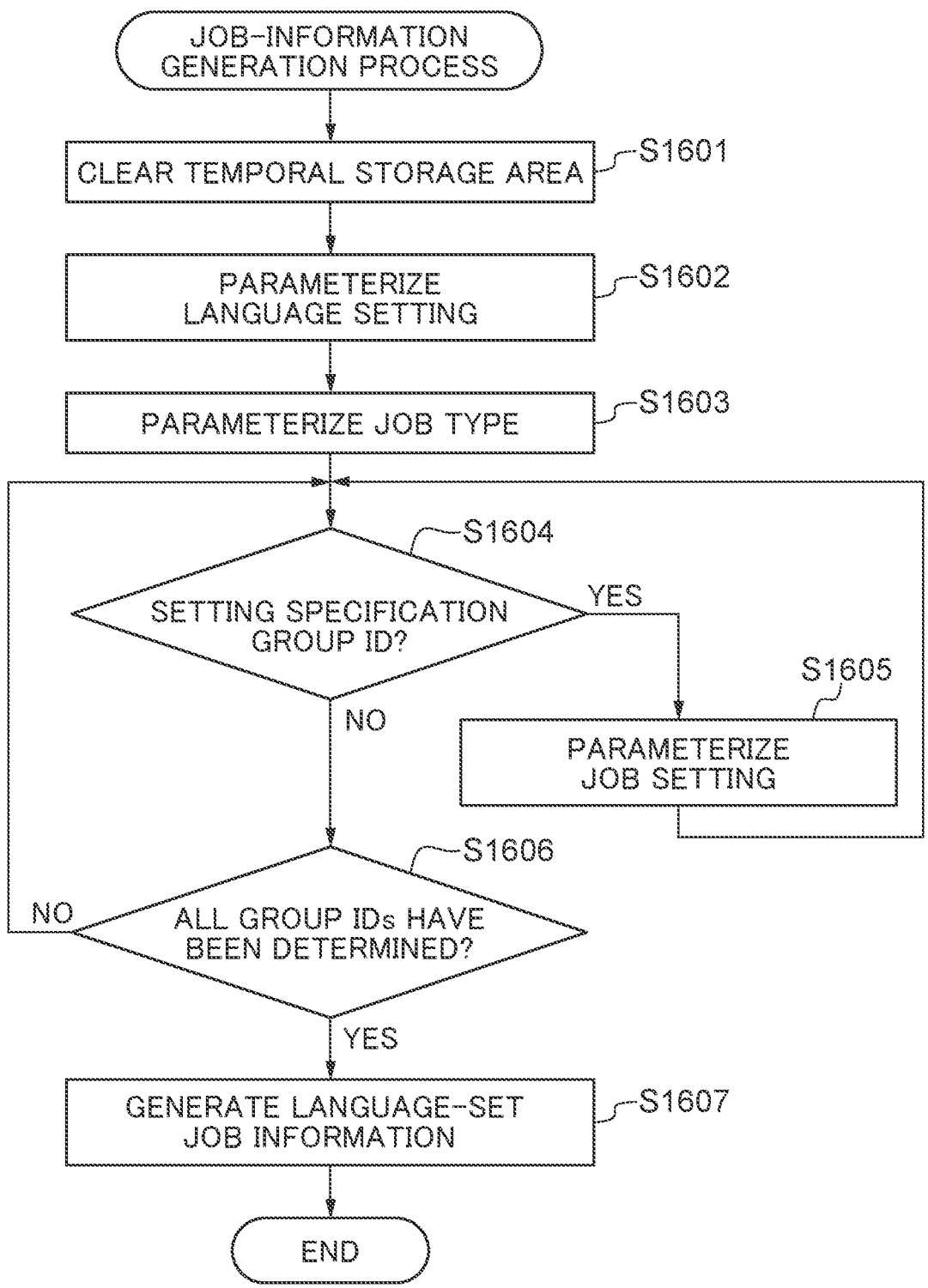
FIG. 16 is a flowchart showing procedures of a job information generation process of a step S1502 in FIG. 15.

FIG. 16 is a flowchart showing procedures of a job information generation process of the step S1502 in FIG. 15.

Figure 17:
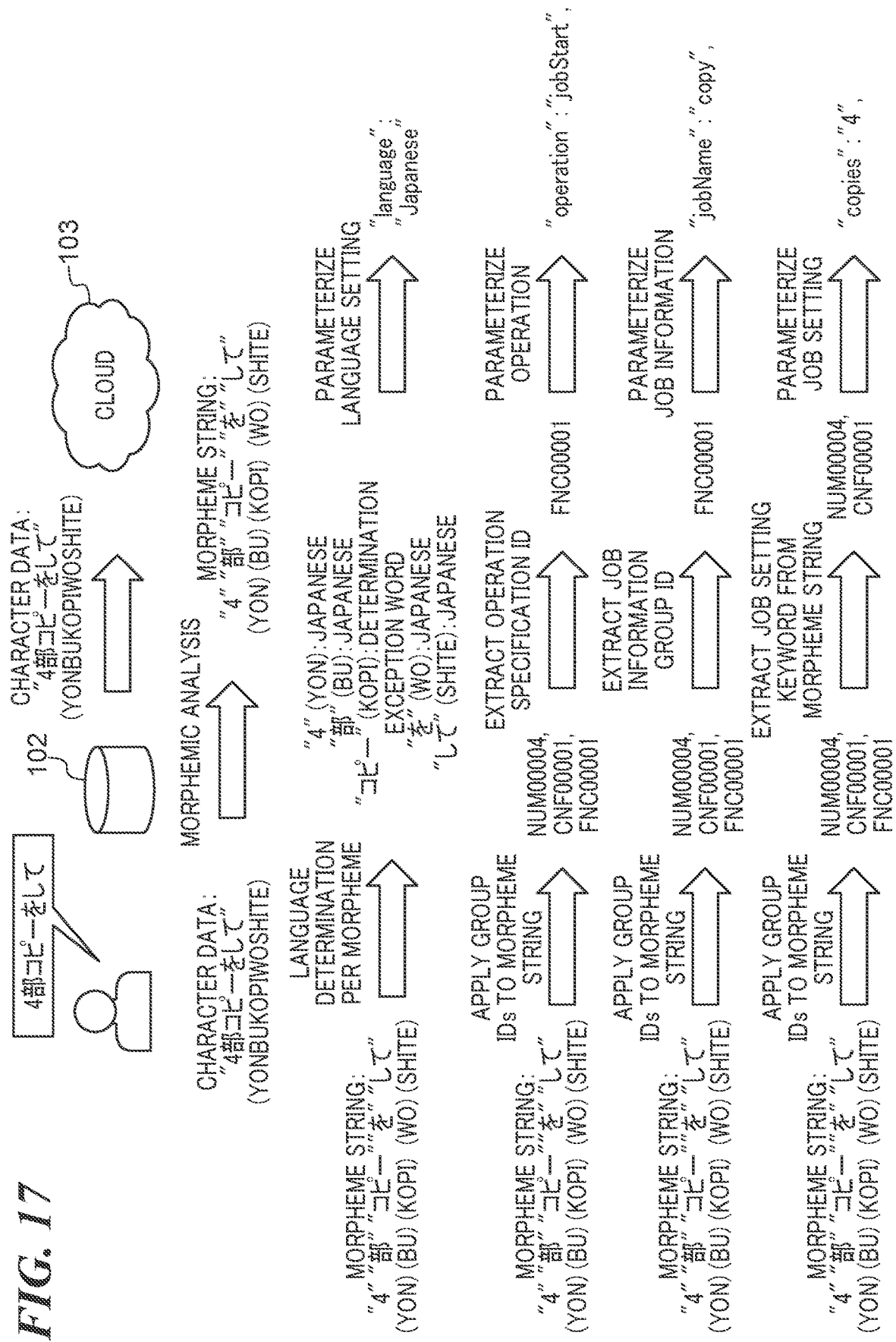
FIG. 17 is a view schematically showing a flow of generation of language-set job information in Japanese in the embodiment.
Figure 18:
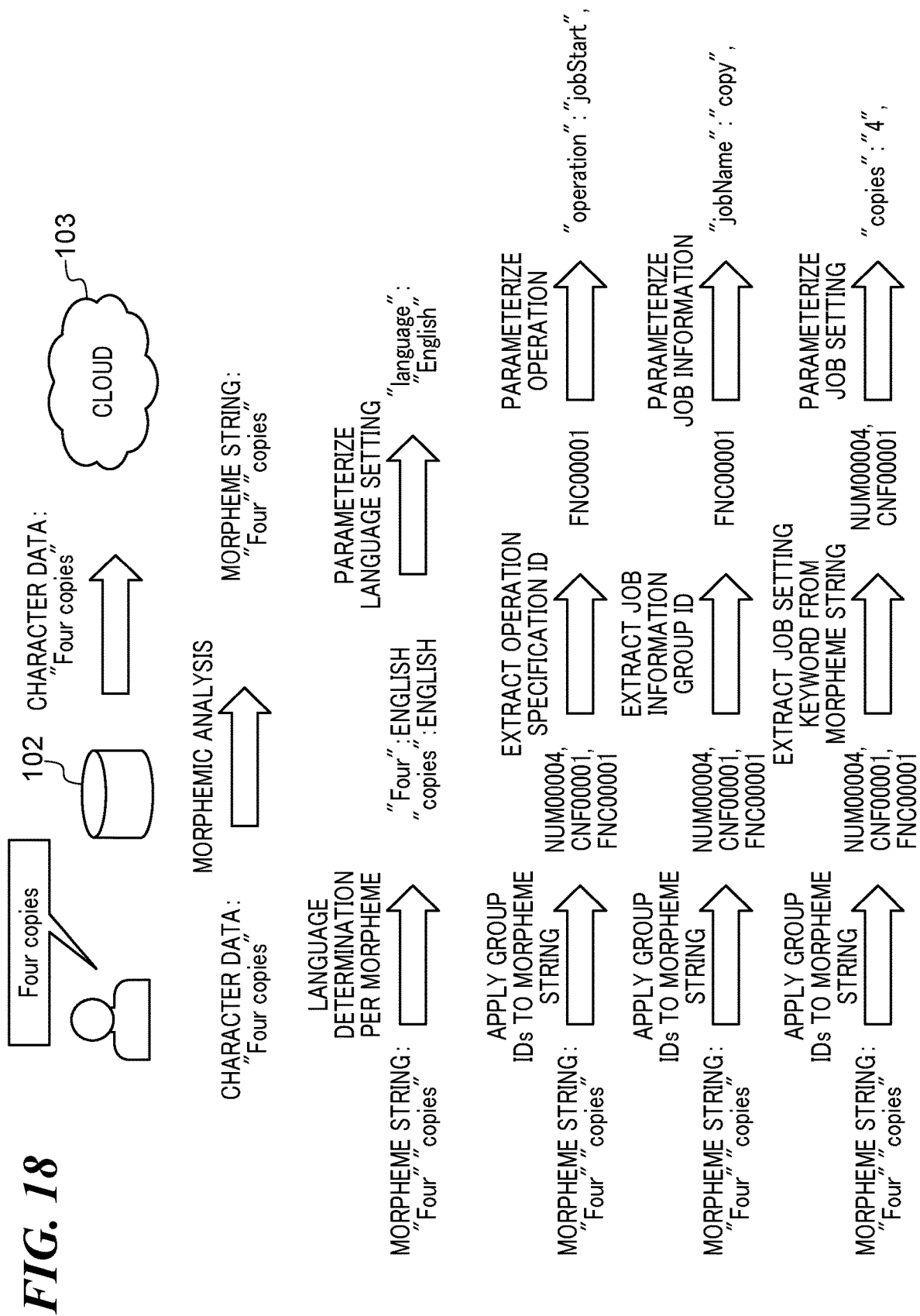
FIG. 18 is a view schematically showing a flow of generation of language-set job information in English in the embodiment.

As shown in FIG. 16, the CPU 402 clears the temporary storage area used for a job information generation process on the RAM 403 (a step S1601). This temporary storage area includes a language-determination-character-string storage area, a job character string storage area, and a job-setting-character-string storage area. Next, the CPU 402 parameterizes the language setting (a step S1602). Specifically, the CPU 402 generates the parameter character string corresponding to the language determination result stored in the language-determination-result storage area in the RAM 403. For example, when "Japanese" is stored as the language determination result in the language-determination-result storage area, the CPU 402 generates, as shown in FIG. 17, the character string {"language": "Japanese"} showing that the language setting is Japanese and stores the character string concerned in the language-determination-character-string storage area. Moreover, when "English" is stored as the language determination result in the language-determination-result storage area, the CPU 402 generates, as shown in FIG. 18, the character string {"language": "English"} showing that the language setting is English and stores the character string concerned in the language-determination-character-string storage area.

Next, the CPU 402 parameterizes the job type (a step S1603). Specifically, the CPU 402 extracts the job type specifying group ID from the group ID storage area in the RAM 403 and generates a parameter character string corresponding to the job type specifying group ID concerned. For example, as shown in FIG. 17 or FIG. 18, when "NUM00004", "CNF00001", and "FNC00001" are stored in the group ID storage area, the CPU 402 extracts "FNC00001" that is the job type specifying group ID from among them and generates the character string {"jobName": "copy" } as the parameter character string corresponding to "FNC00001". The CPU 402 stores the generated character string in the job character string storage area.

Next, the CPU 402 determines whether the stored group ID is the setting specification group ID sequentially from the head address of the group ID storage area (a step S1604).

As a result of the determination in the step S1604, when the stored group ID is the setting specification group ID, the CPU 402 parameterizes the job setting (a step S1605). Specifically, the CPU 402 generates a character string corresponding to the group ID determined as the setting specification group ID and stores the character string concerned in the job-setting-character-string storage area in the RAM 403. After that, the job information generation process returns to the step S1604. In this way, the character string corresponding to the setting specification group ID stored in the group ID storage area is generated in the embodiment. For example, when "NUM00004", "CNF00001", and "FNC00001" are stored in the group ID storage area, the CPU 402 generates, as shown in FIG. 17 and FIG. 18, "copies" as the character string corresponding to "CNF00001" that is the setting specification group ID. Moreover, the CPU 402 generates "4" as a character string corresponding to "NUM00004" that is the setting specification group ID as shown in FIG. 17 or FIG. 18. The CPU 402 stores these generated character strings in the job-setting-character-string storage area.

As a result of the determination in the step S1604, when the stored group ID is not the setting specification group ID, the CPU 402 determines whether all the group IDs stored in the group ID storage area have been subjected to the determination of the step S1604 (a step S1606).

As a result of the determination in the step S1606, when not all the group IDs stored in the group ID storage area have been subjected to the determination of the step S1604, the job information generation process returns to the step S1604. As a result of the determination in the step S1606, when all the group IDs stored in the group ID storage area have been subjected to the determination of the step S1604, the CPU 402 generates the language-set job information, which is device operation data for instructing the MFP 101 to execute a job, on the basis of the character strings stored in the language-determination-character-string storage area, the job character string storage area, and the job-setting-character-string storage area (a step S1607). The language-set job information is, for example, the data in the JSON format as shown in FIG. 8. The data format of the language-set job information is not restricted to the JSON format. The data format may be another format like the XML format. After that, the job information generation process is finished.

Figure 19:
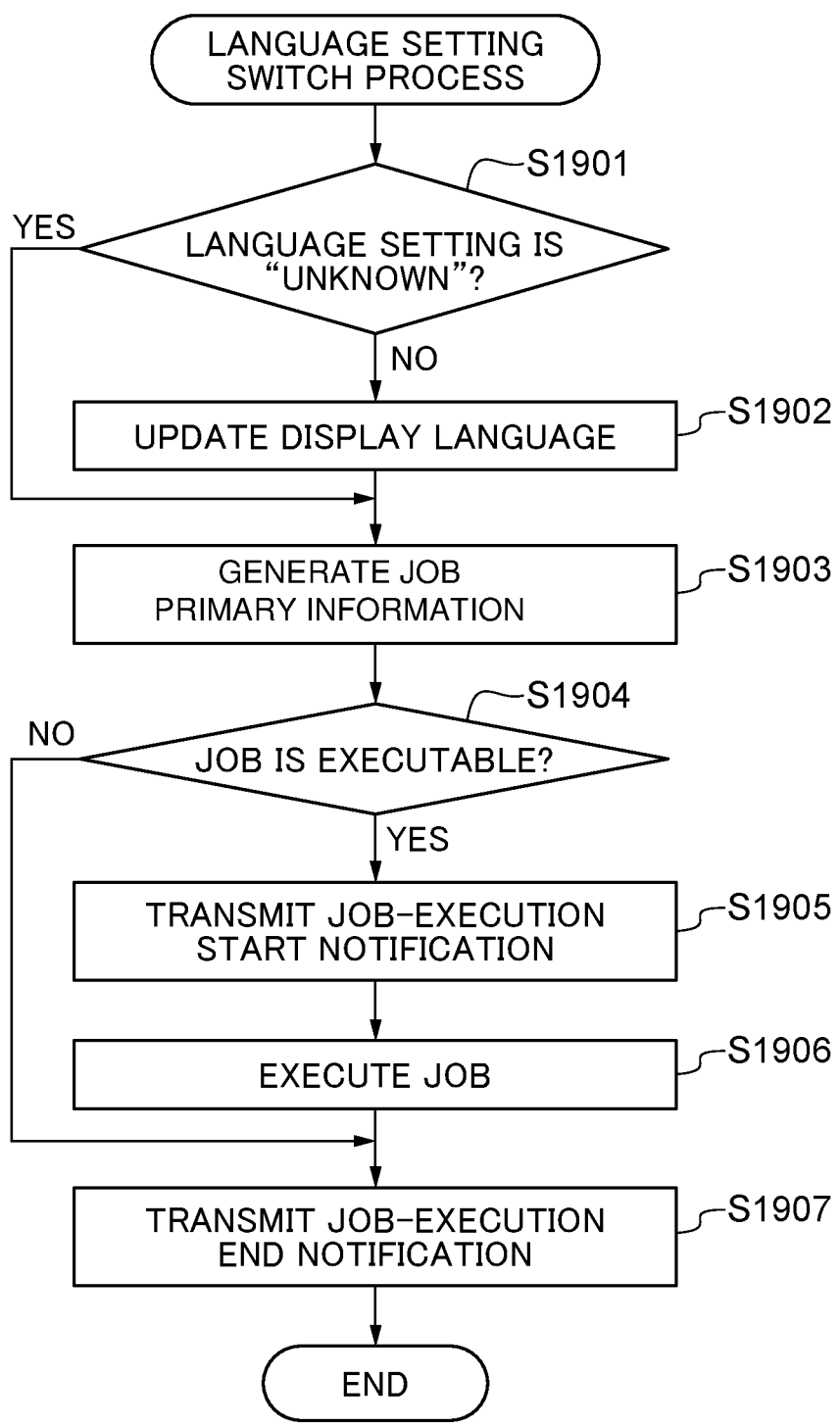
FIG. 19 is a flowchart showing a language setting switching process executed by the MFP that receives language-set job information from the cloud server.

FIG. 19 is a flowchart showing a language setting switching process executed by the MFP 101 that receives the language-set job information from the cloud server 103. The language setting switching process of FIG. 19 is achieved because the CPU 202 of the MFP 101 runs the control program developed from the ROM 204 to the RAM 203.

As shown in FIG. 19, the CPU 202 obtains the language setting from the received language-set job information by the data analysis module 502 and determines whether the obtained language setting is "unknown" (a step S1901).

As a result of the determination in the step S1901, when the obtained language setting is "unknown", the language setting switching process proceeds to the step S1903 mentioned later. As a result of the determination in the step S1901, when the obtained language setting is not "unknown", the CPU 202 updates the display language of the operation panel 209 (a step S1902). Specifically, the CPU 202 stores the obtained language setting in an MFP-language-setting storage area in the storage unit 205. Next, the CPU 202 obtains the job type and job setting from the received language-set job information. The CPU 202 generates job primary information corresponding to the obtained job type (a step S1903) and stores the job primary information concerned in the RAM 203. Moreover, the CPU 202 sets a parameter corresponding to the obtained job setting to the above-mentioned job primary information.

Next, the CPU 202 determines whether the job is executable (a step S1904). In the step S1904, the CPU 202 determines that the job is not executable when the MFP 101 cannot execute new job because of execution of another job or occurrence of an error, for example. In the meantime, when the MFP 101 can execute a new job, the CPU 202 is determined that a job is executable.

As a result of the determination in the step S1904, when a job is not executable, the language setting switching process proceeds to a step S1907 mentioned later. As a result of the determination in the step S1904, when a job is executable, the CPU 202 transmits a job-execution start notification to the cloud server 103 through the network 104 by the data transmission/reception module 501 (a step S1905). Next, the CPU 202 executes a job on the basis of the job primary information generated in the step S1903 (a step S1906). Next, the CPU 202 transmits the job-execution end notification to the cloud server 103 through the network 104 by the data transmission/reception module 501 (a step S1907). The job-execution end notification includes a job execution result. For example, when the job executed in the step S1906 is completed normally, the job-execution end notification includes the job execution result showing that the job has been completed normally. Moreover, when it is determined that a job is not executable in the step S1904 or when the job executed in the step S1906 has been finished abnormally due to a paper jam etc., the job-execution end notification includes the job execution result that shows an error. The cloud server 103 generates an audio message corresponding to the job execution result included in the received job-execution end notification. After the CPU 202 executes the process of the step S1907, the language setting switching process is finished.

Figure 20:
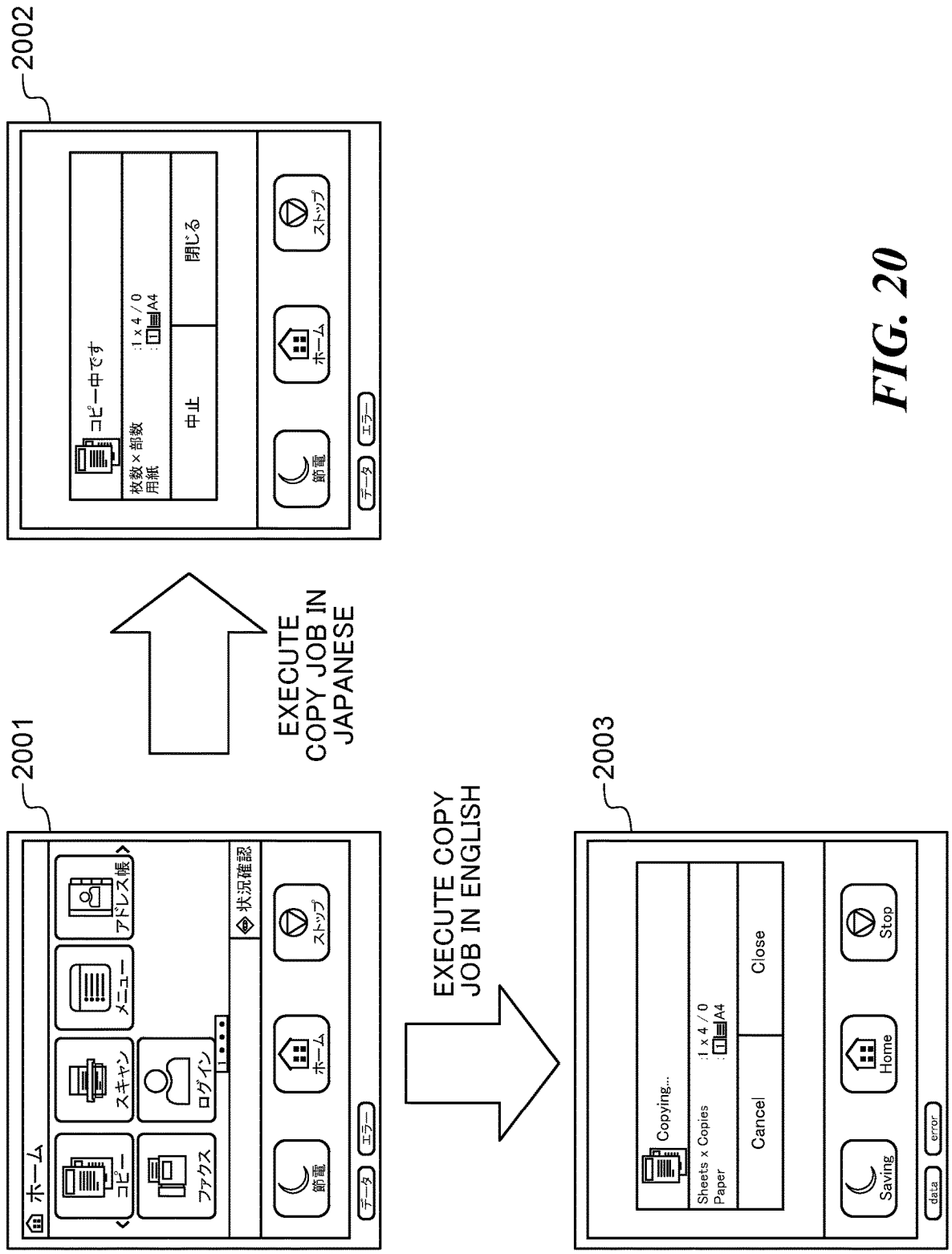
FIG. 20 is a view showing screen transitions of an operation panel of the MFP when execution of a copy job is instructed by a voice input.

FIG. 20 is a view showing screen transitions of the operation panel 209 of the MFP 101 when execution of a copy job is instructed by a voice input.

When the MFP 101 receives the language-set job information including {"language": "Japanese"}, {"operation": "jobStart"}, and {"jobName": "copy"} from the cloud server 103 in a state where the home screen 2001 is displayed on the operation panel 209 as shown in FIG. 20, the MFP 101 sets the language setting to Japanese and starts execution of the copy job. When the copy job is executed in the state where the language setting is set to Japanese, a copying screen 2002 the display language of which is Japanese is displayed on the operation panel 209.

Moreover, when the MFP 101 receives the language-set job information including {"language": "English"}, {"operation": "jobStart"}, and {"jobName": "copy"} from the cloud server 103 in the state where the home screen 2001 is displayed on the operation panel 209, the MFP 101 sets the language setting to English and starts execution of the copy job. When the copy job is executed in the state where the language setting is set to English, a copying screen 2003 the display language of which is English is displayed on the operation panel 209.

Figure 21:
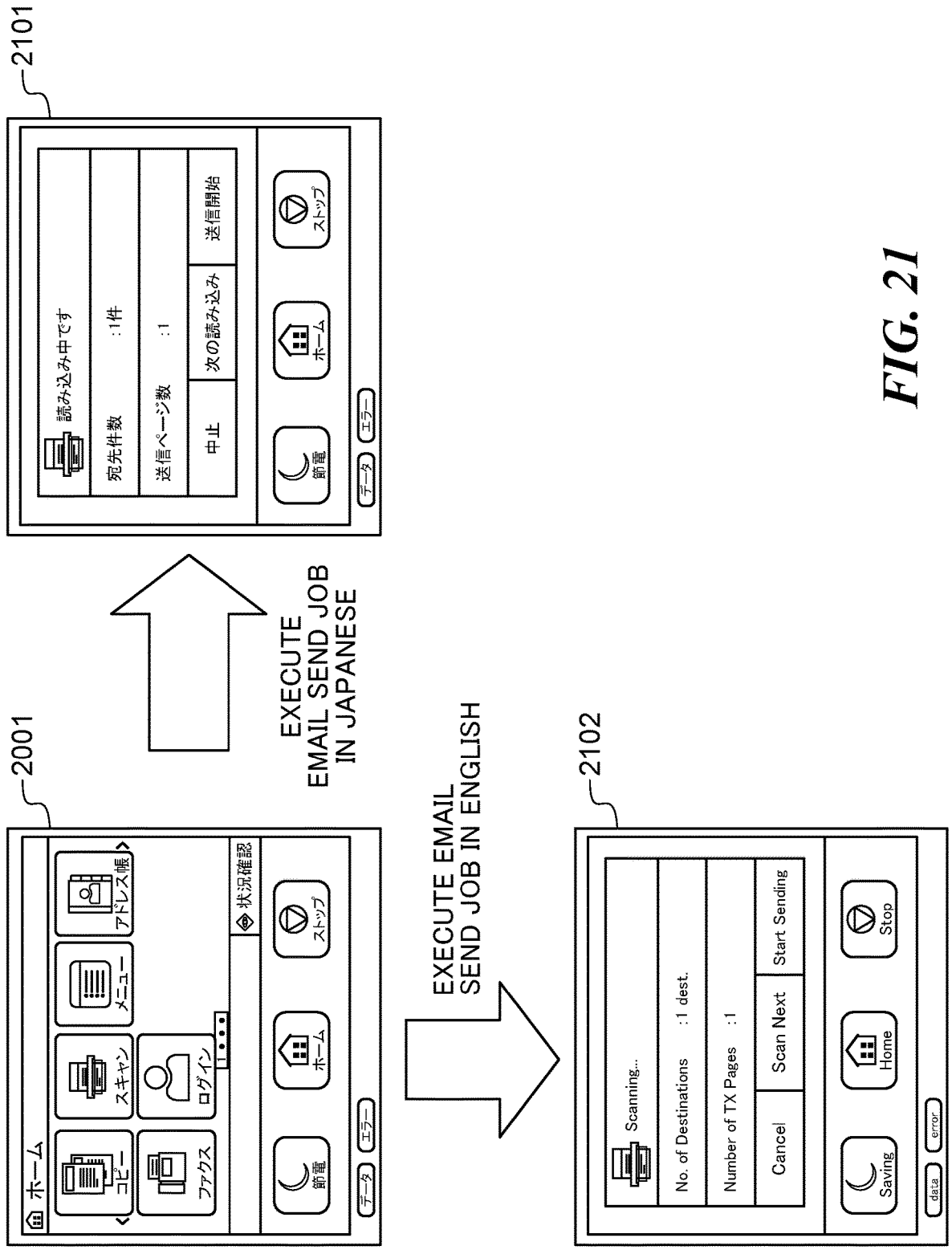
FIG. 21 is a view showing screen transitions of the operation panel of the MFP when execution of an EMAIL SEND job is instructed by a voice input.

FIG. 21 is a view showing screen transitions of the operation panel 209 of the MFP 101 when execution of an EMAILSEND job is instructed by a voice input.

When the MFP 101 receives the language-set job information including {"language": "Japanese"}, {"operation": "jobStart"}, and {"jobName": "emailSend"} from the cloud server 103 in the state where the home screen 2001 is displayed on the operation panel 209 as shown in FIG. 21, the MFP 101 sets the language setting to Japanese and starts execution of the EMAILSEND job. When the EMAILSEND job is executed in the state where the language setting is set to Japanese, a scanning screen 2101 the display language of which is Japanese is displayed on the operation panel 209.

Moreover, when the MFP 101 receives the language-set job information including {"language": "English"}, {"operation": "jobStart"}, and {"jobName": "emailSend"} from the cloud server 103 in the state where the home screen 2001 is displayed on the operation panel 209, the MFP 101 sets the language setting to English and starts execution of the EMAILSEND job. When the EMAILSEND job is executed in the state where the language setting is set to English, a scanning screen 2102 the display language of which is English is displayed on the operation panel 209. Although the home screen 2001 is described as one example of a job executable screen in the embodiment, the job executable screen is not limited to the home screen 2001. Moreover, when the MFP 101 receives the language-set job information from the cloud server 103 in the power saving mode in which the job executable screen is not displayed and the powers of the operation panel 209 and print engine 211 are OFF, the MFP 101 may set up the language setting on the basis of the received language-set job information and may execute the job as mentioned above.

Figure 22:
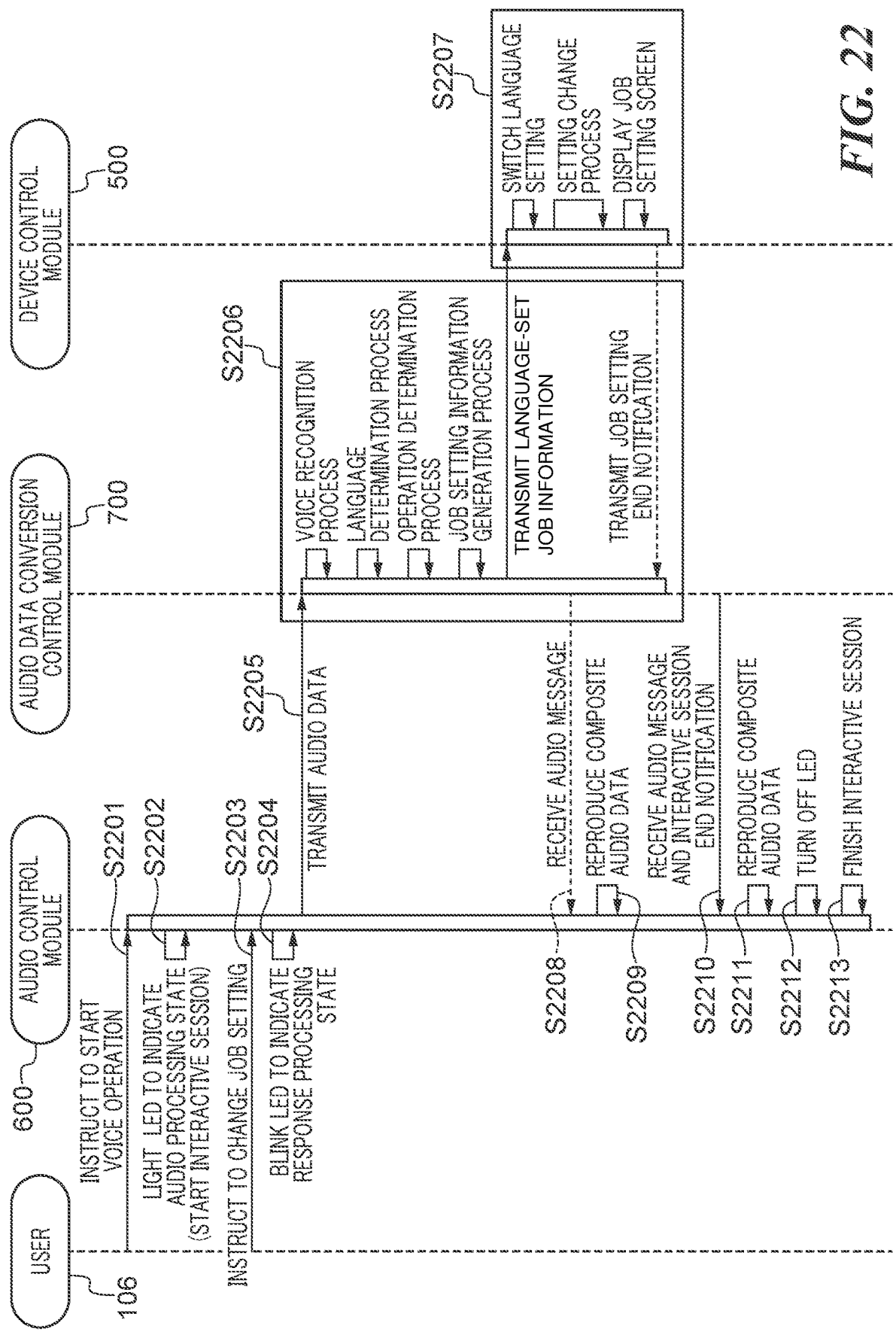
FIG. 22 is a sequence chart showing procedures of a process executed when the image forming system of FIG. 1 receives a job setting change instruction by voice input.

FIG. 22 is a sequence chart showing procedures of a process executed when the image forming system 100 of FIG. 1 receives a job setting change instruction by a voice input. It should be noted that the smart speaker 102, MFP 101, and cloud server 103 shall be communicable mutually in FIG. 22 as with the description about FIG. 10. Moreover, the process of FIG. 22 assumes that a home screen 2801 in FIG. 28 on which functions, such as copy, scan, and print, can be called are displayed on the operation panel 209 of the MFP 101.

In a step S2201 in FIG. 22, the user gives an instruction to the smart speaker 102 to start a voice operation as with the step S1001.

When the start instruction of the voice operation is detected, the display module 606 of the audio control module 600 in the smart speaker 102 lights the LED 312 as a notification to show being in the utterance processing state in a step S2202 like the step S1002. Moreover, the process by the voice obtainment module 604 is started.

In a step S2203, the user performs the function call instruction to the smart speaker 102. For example, the user utters a phrase, such as "kopinoudosetteiyon" or "Set copy density four", that is the job setting change instruction as a function call instruction following the wake word detected in the step S2201. Audio data is generated on the basis of user's voice that is obtained by the voice obtainment module 604. When the pause period of the predetermined period continues, the utterance end determination module 608 determines that the utterance ends.

In a step S2204, the display module 606 of the audio control module 600 blinks the LED 312 as a notification to indicate being in the response processing state depending on the utterance end determination as with the step S1004. Moreover, the process by the voice obtainment module 604 is completed. In a step S2205, the data transmission/reception module 601 transmits the generated audio data to the cloud server 103 as with the step S1005.

In a step S2206, the audio data conversion control module 700 in the cloud server 103 executes the voice-operation-service execution process of FIG. 11 mentioned above. In the voice-operation-service execution process, the language-set job information mentioned later is transmitted to the MFP 101, for example.

In a step S2207, the device control module 500 in the MFP 101 executes a language setting switching process of FIG. 19 mentioned later on the basis of the job setting information received from the cloud server 103.

In a step S2208, the data transmission/reception module 601 in the smart speaker 102 receives an audio message from the cloud server 103. In the next step S2209, the audio reproduction module 605 reproduces the composite audio data into which the audio message received in the step S2208 is converted. For example, the audio reproduction module 605 reproduces the composite audio data "density setting will be started" through the loudspeaker 310.

In a step S2210, the data transmission/reception module 601 receives an audio message that is different from the audio message received in the step S2208 from the cloud server 103. Moreover, the data transmission/reception module 601 receives the interactive session end notification that finishes then interactive session with the user from the cloud server 103.

In a step S2211, the audio reproduction module 605 reproduces the composite audio data into which the audio message received in the step S2210 is converted. For example, the audio reproduction module 605 reproduces the composite audio data "density setting has been finished" through the loudspeaker 310.

In a step S2212, the display module 606 turns off the LED 312 as a notification showing that the smart speaker 102 is in the standby state in response to the reception of the interactive session end notification by the data transmission/reception module 601 in the step S2210.

In a step S2213, the audio control module 600 shifts the smart speaker 102 to the standby state in response to the reception of the interactive session end notification by the data transmission/reception module 601 in the step S2210.

Figure 23:
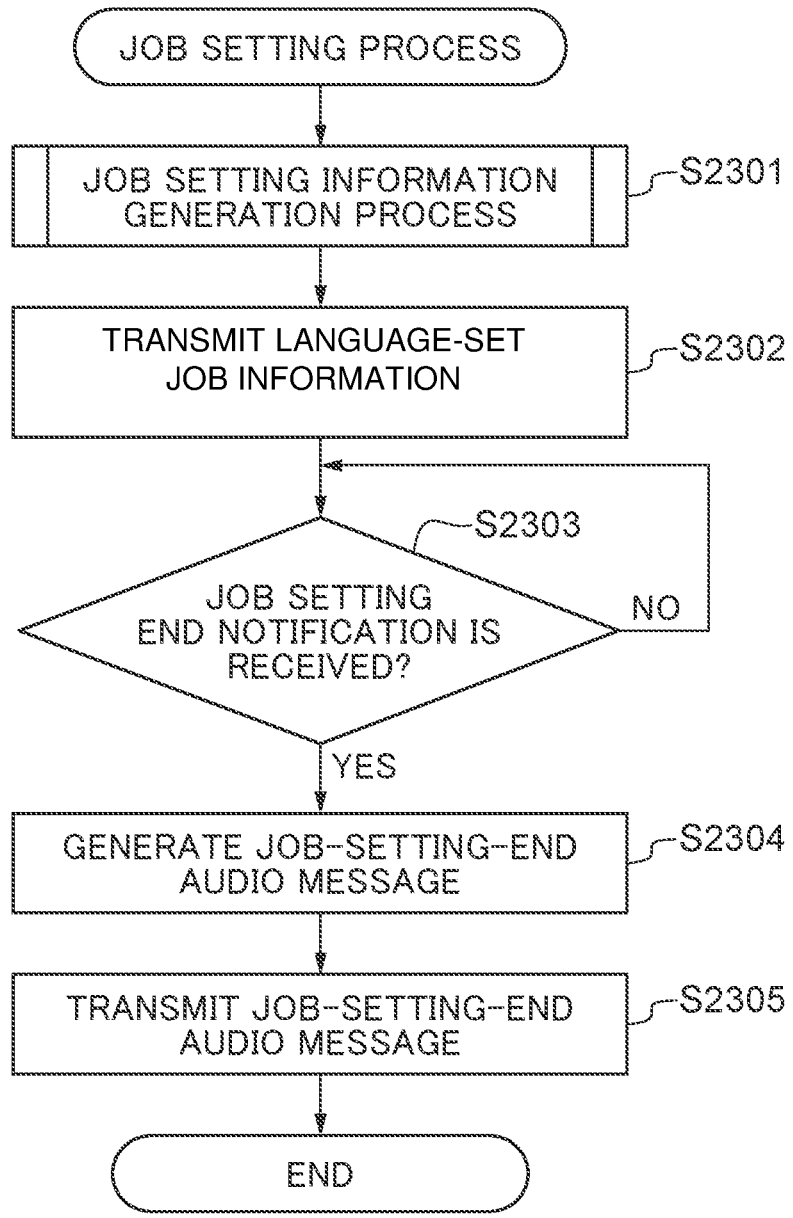
FIG. 23 is a flowchart showing procedures of a job setting process of a step S1107 in FIG. 11.

FIG. 23 is a flowchart showing procedures of the job setting process of the step S1107 in FIG. 11. The job setting process of FIG. 23 is executed when the cloud server 103 receives audio data generated on the basis of user's voice that is a job setting change instruction from the smart speaker 102.

As shown in FIG. 23, the CPU 402 generates language-set job information including a set value used when the MFP 101 executes a job by executing a job-setting-information generation process of FIG. 24 mentioned later (a step S2301). Next, the CPU 402 transmits the language-set job information concerned to the MFP 101 through the network I/F 406 (a step S2302). Next, the CPU 402 determines whether a job setting end notification is received from the MFP 101 (a step S2303). In the embodiment, when the job setting is completed normally or when the job setting is suspended due to occurrence of an error, the MFP 101 transmits the job setting end notification including the information that indicates such a job setting end state to the cloud server 103. The CPU 402 waits until receiving the job setting end notification from the MFP 101. When the job setting end notification is received from the MFP 101 (YES in the step S2303), the CPU 402 generates a job setting end audio message that is a text message corresponding to the received job setting end notification (a step S2304). In the step S2304, the CPU 402 generates "Job setting has been completed" that is a message at a time of normal end or "Job setting has been impossible" that is a message at a time of occurrence of paper jam or an error in the MFP 101, for example.

Next, the CPU 402 stores the job setting end audio message in the audio message storage area in the RAM 403. Next, the CPU 402 transmits the audio message stored in the audio message storage area to the smart speaker 102 through the network I/F 406 (a step S2305) and finishes the job setting process.

Figure 24:
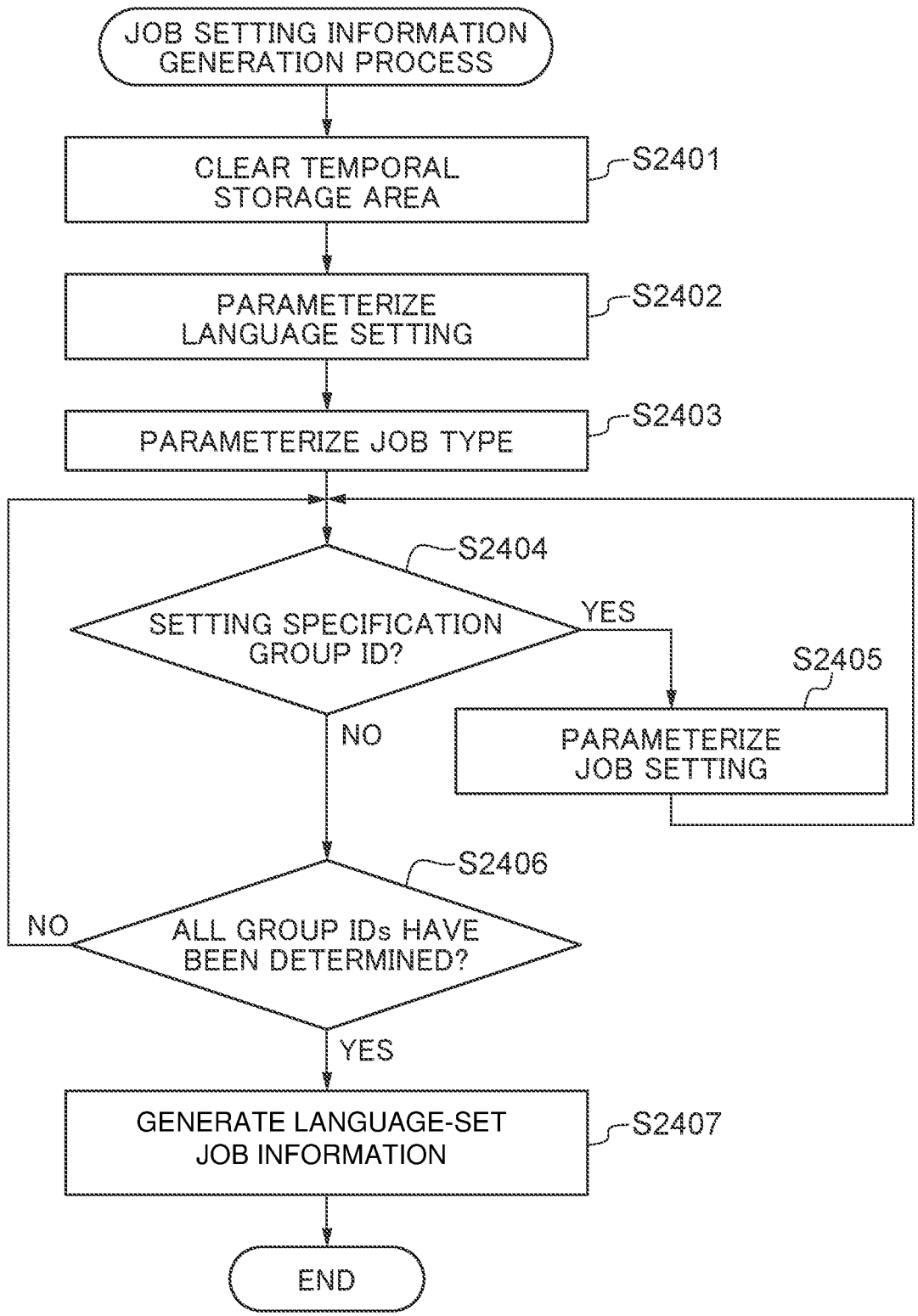
FIG. 24 is a flowchart showing procedures of a job setting information generation process of a step S2301 in FIG. 23.

FIG. 24 is a flowchart showing procedures of the job setting information generation process of the step S2301 in FIG. 23.

Figure 25:
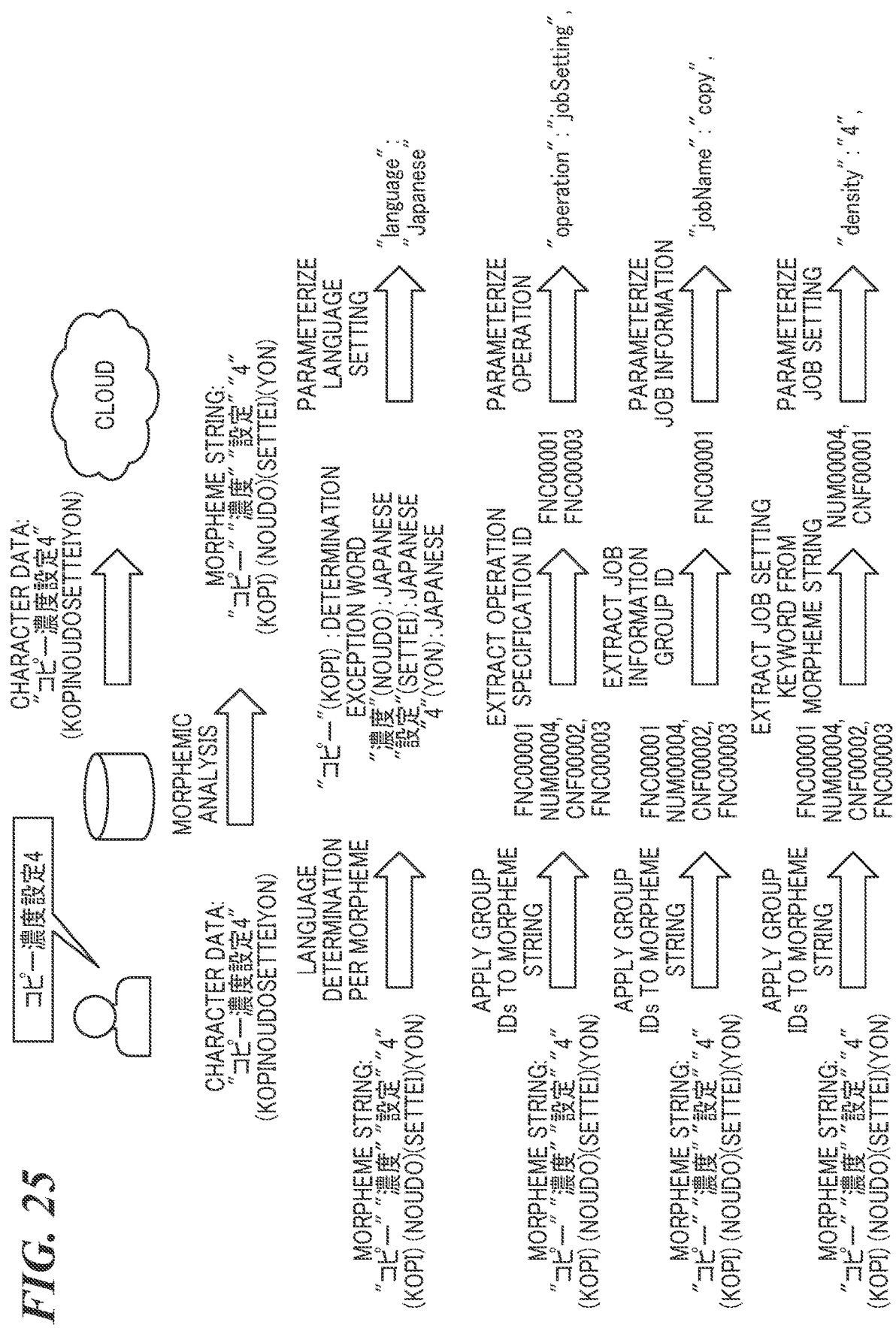
FIG. 25 is a view schematically showing a flow of generation of job setting information having a Japanese language setting in the embodiment.
Figure 26:
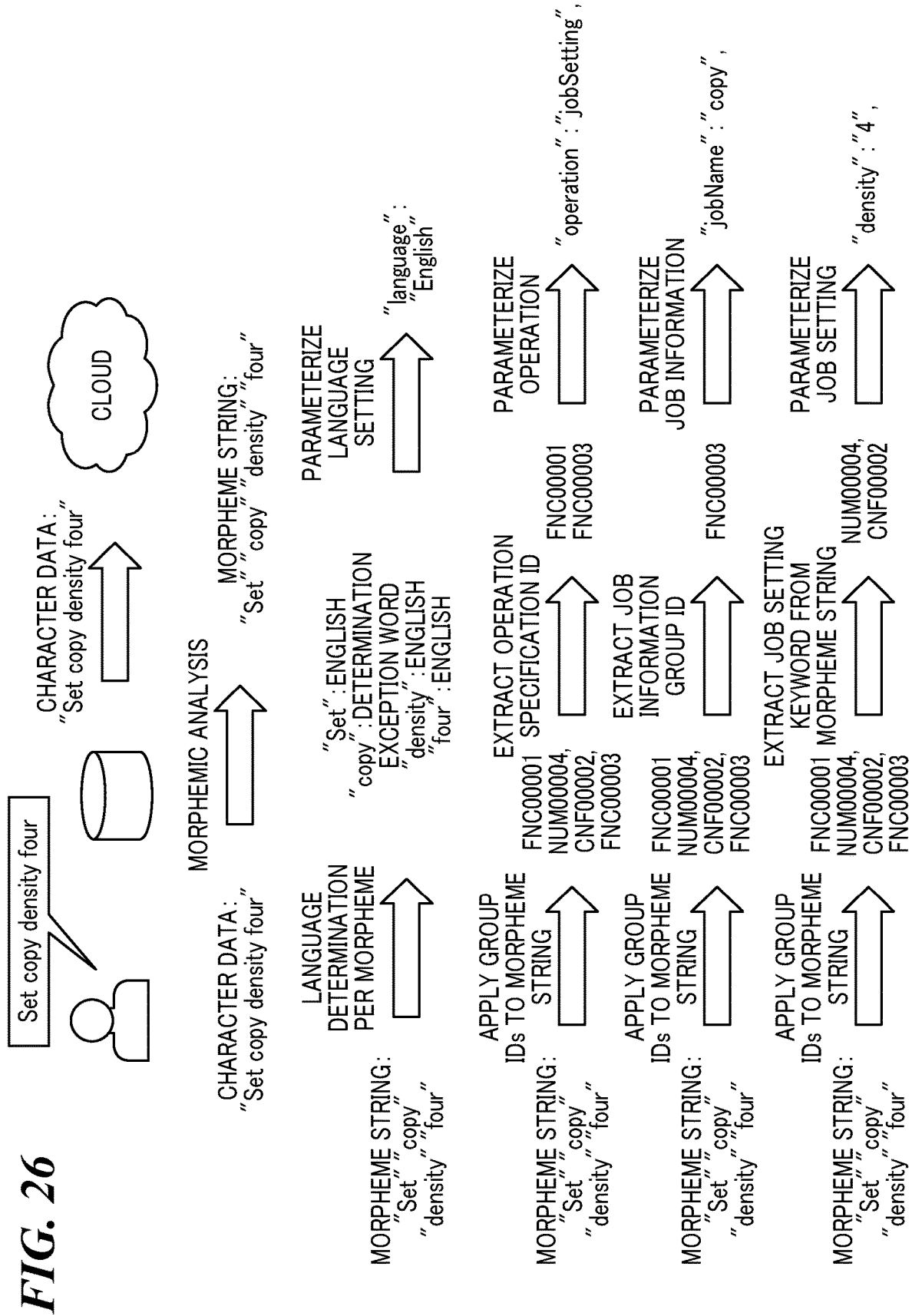
FIG. 26 is a view schematically showing a flow of generation of the job setting information having an English language setting in the embodiment.

As shown in FIG. 24, the CPU 402 clears the temporary storage area used for the job setting information generation process on the RAM 403 (a step S2401). The temporary storage area includes a language-determination-character-string storage area, a job character string storage area, and a job-setting-character-string storage area. Next, the CPU 402 parameterizes the language setting (a step S2402). Specifically, the CPU 402 generates the parameter character string corresponding to the language determination result stored in the language-determination-result storage area in the RAM 403. For example, when "Japanese" is stored as the language determination result in the language-determination-result storage area, the CPU 402 generates, as shown in FIG. 25, the character string {"language": "Japanese" } showing that the language setting is Japanese and stores the character string concerned in the language-determination-character-string storage area. Moreover, when "English" is stored as the language determination result in the language-determination-result storage area, the CPU 402 generates, as shown in FIG. 26, the character string {"language": "English"} showing that the language setting is English and stores the character string concerned in the language-determination-character-string storage area.

Next, the CPU 402 parameterizes the job type (a step S2403). Specifically, the CPU 402 extracts the job type specifying group ID from the group ID storage area in the RAM 403 and generates a parameter character string corresponding to the job type specifying group ID concerned. For example, as shown in FIG. 25 or FIG. 26, when "FNC00001", "NUM00004", "CNF00002", and "FNC00003" are stored in the group ID storage area, the CPU 402 extracts "FNC00001" that is the job type specifying group ID from among them and generates the character string {"jobName": "copy" } as the parameter character string corresponding to "FNC00001". The CPU 402 stores the generated character string in the job character string storage area.

Next, the CPU 402 determines whether the stored group ID is the setting specification group ID sequentially from the head address of the group ID storage area (a step S2404).

As a result of the determination in the step S2404, when the stored group ID is the setting specification group ID, the CPU 402 parameterizes the job setting (a step S2405). Specifically, the CPU 402 generates a character string corresponding to the group ID determined as the setting specification group ID and stores the character string concerned in the job-setting-character-string storage area in the RAM 403. After that, the job setting information generation process returns to the step S2404. In this way, the character string corresponding to the setting specification group ID stored in the group ID storage area is generated in the embodiment. For example, when "FNC00001", "NUM00004", "CNF00002", and "FNC00003" are stored in the group ID storage area, the CPU 402 generates, as shown in FIG. 25 and FIG. 26, "density" as the character string corresponding to "CNF00002" that is the setting specification group ID. Moreover, the CPU 402 generates "4" as a character string corresponding to "NUM00004" that is the setting specification group ID as shown in FIG. 25 or FIG. 26. The CPU 402 stores these generated character strings in the job-setting-character-string storage area.

As a result of the determination in the step S2404, when the stored group ID is not the setting specification group ID, the CPU 402 determines whether all the group IDs stored in the group ID storage area have been subjected to the determination of the step S2404 (a step S2406).

As a result of the determination in the step S2406, when not all the group IDs stored in the group ID storage area have been subjected to the determination of the step S2404, the job setting information generation process returns to the step S2404. As a result of the determination in the step S2406, when all the group IDs stored in the group ID storage area have been subjected to the determination of the step S2404, the CPU 402 generates the language-set job information, which is device operation data for instructing the MFP 101 to execute a job, on the basis of the character strings stored in the language-determination-character-string storage area, the job character string storage area, and the job-setting-character-string storage area (a step S2407). The language-set job information is, for example, the data in the JSON format as shown in FIG. 9. The data format of the language-set job information is not restricted to the JSON format. The data format may be another format like the XML format.

Figure 27:
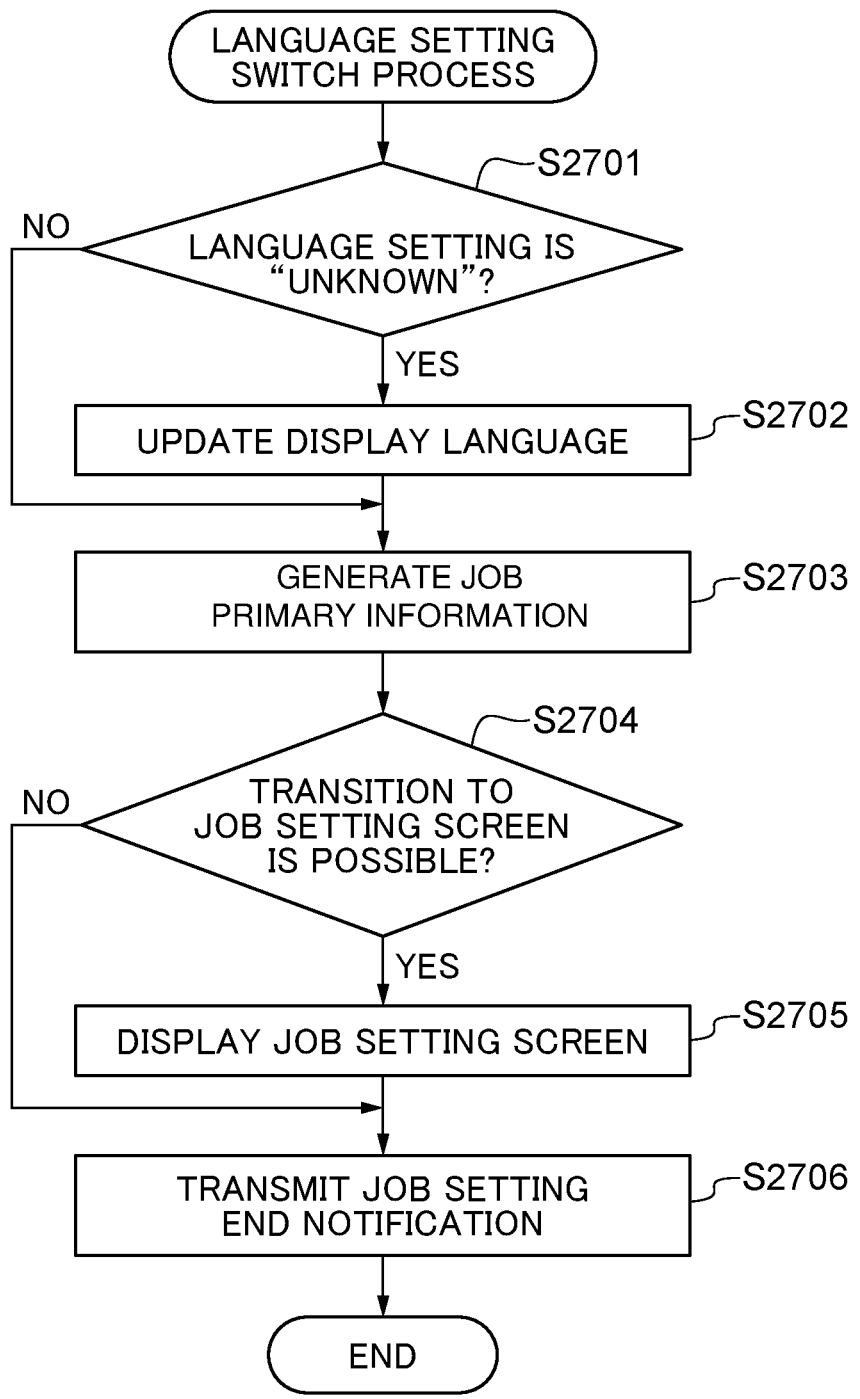
FIG. 27 is a flowchart showing a language setting switching process executed by the MFP that receives language-set job information from the cloud server.

FIG. 27 is a flowchart showing a language setting switching process executed by the MFP 101 that receives the language-set job information from the cloud server 103. The language setting switching process of FIG. 27 is achieved because the CPU 202 of the MFP 101 runs the control program developed from the ROM 204 to the RAM 203.

As shown in FIG. 27, the CPU 202 obtains the language setting from the received language-set job information by the data analysis module 502 and determines whether the obtained language setting is "unknown" (a step S2701).

As a result of the determination in the step S2701, when the obtained language setting is "unknown", the language setting switching process proceeds to a step S2703 mentioned later. As a result of the determination in the step S2701, when the obtained language setting is not "unknown", the CPU 202 updates the display language of the operation panel 209 (a step S2702). Specifically, the CPU 202 stores the obtained language setting in the MFP-language-setting storage area in the storage unit 205. Next, the CPU 202 obtains the job type and job setting from the received language-set job setting information. The CPU 202 generates job primary information corresponding to the obtained job type (a step S2703) and stores the job primary information concerned in the RAM 203. Moreover, the CPU 202 sets a parameter corresponding to the obtained job setting to the above-mentioned job primary information.

Next, the CPU 202 determines whether transition of a screen of the operation panel 209 to a job setting screen is possible (a step S2704). A user can set a set value, which is needed to execute a job, on the job setting screen. In the step S2704, when the transition of the screen of the operation panel 209 is impossible because the MFP 101 is executing another job or causes an error, the CPU 202 determines that the transition of the screen of the operation panel 209 to the job setting screen is impossible, for example. In the meantime, when the transition of the screen of the operation panel 209 is possible, the CPU 202 determines that the transition of the screen of the operation panel 209 to the job setting screen is possible.

As a result of the determination in the step S2704, when the transition of the screen of the operation panel 209 to the job setting screen is impossible, the language setting switching process proceeds to a step S2706 mentioned later. As a result of the determination in the step S2704, when the transition of the screen of the operation panel 209 to the job setting screen is possible, the job setting screen is displayed on the operation panel 209 (a step S2705). Next, the CPU 202 transmits the job setting end notification to the cloud server 103 through the network 104 by the data transmission/reception module 501 (a step S2706). The job setting end notification includes a job setting result. For example, when the screen transition is completed normally, the job setting end notification includes the job setting result showing that the screen transition has been completed normally. Moreover, when it is determined that the transition of the screen of the operation panel 209 to the job setting screen is impossible in the step S2704, the job setting end notification includes the job setting result indicating an error. After the CPU 202 executes the process of the step S2706, the language setting switching process is finished.

Figure 28:
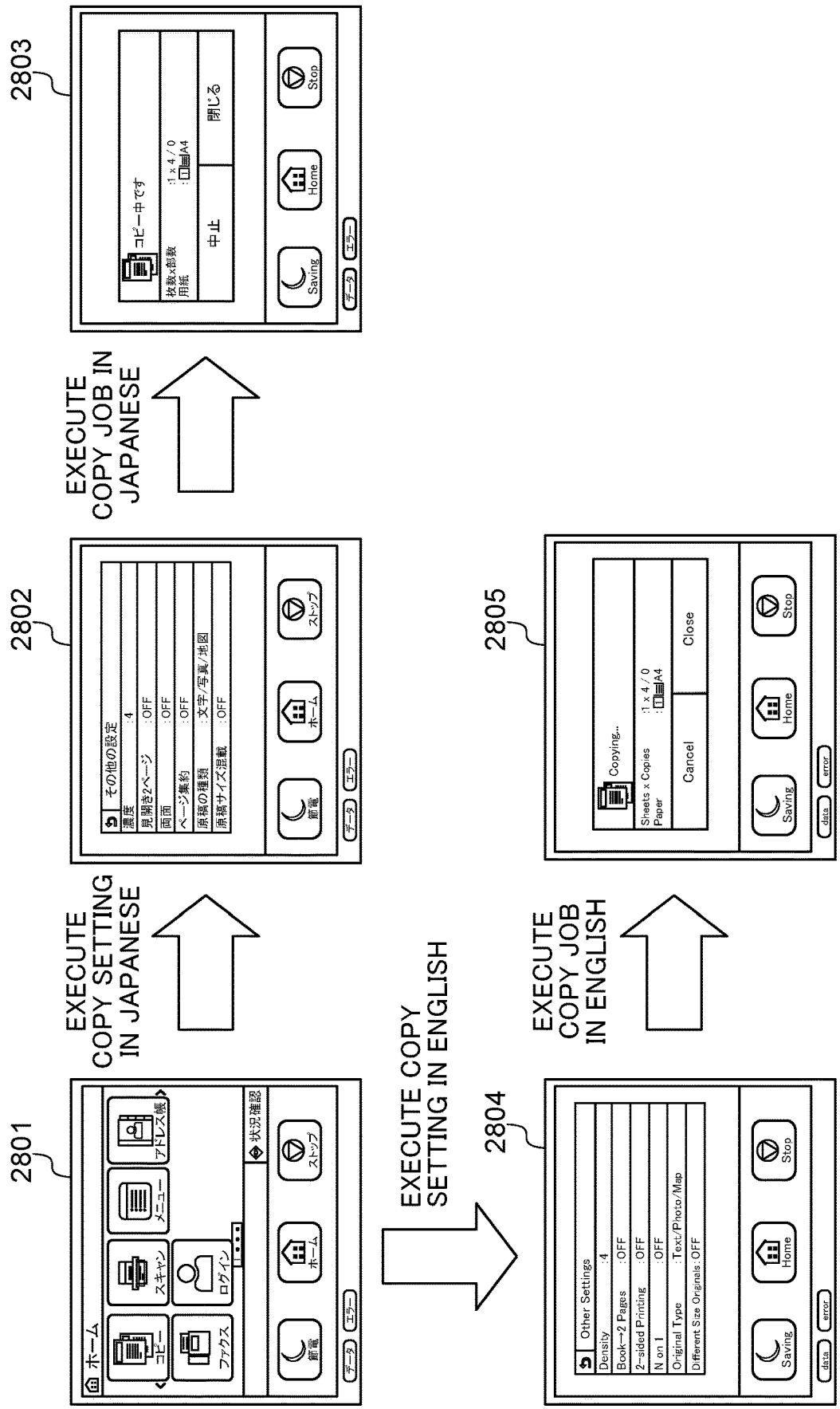
FIG. 28 is a view showing screen transitions of the operation panel of the MFP when the setting of a copy job is input by user's voice.

FIG. 28 is a view showing screen transitions of the operation panel 209 of the MFP 101 when the setting of a copy job is input by user's voice.

As shown in FIG. 28, when the MFP 101 receives the language-set job information including {"language": "Japanese"}, {"operation": "jobSetting"}, and {"jobName": "copy"} from the cloud server 103 in the state where the home screen 2801 is displayed on the operation panel 209, the MFP 101 sets the language setting to Japanese. A copy setting screen 2802 the display language of which is Japanese is displayed on the operation panel 209. After that, when the user gives a job execution instruction from the smart speaker 102 or the operation panel 209, the job control module 503 executes the copy job, and a copy executing screen 2803 the display language of which is Japanese is displayed on the operation panel 209.

Moreover, when the MFP 101 receives the language-set job information including {"language": "English"}, {"operation": "jobSetting"}, and {"jobName": "copy"} from the cloud server 103 in the state where the home screen 2801 is displayed on the operation panel 209, the MFP 101 sets the language setting to English. A copy setting screen 2804 the display language of which is English is displayed on the operation panel 209. After that, when the user gives a job execution instruction from the smart speaker 102 or the operation panel 209, the job control module 503 executes the copy job, and a copy executing screen 2805 the display language of which is English is displayed on the operation panel 209.

Figure 29:
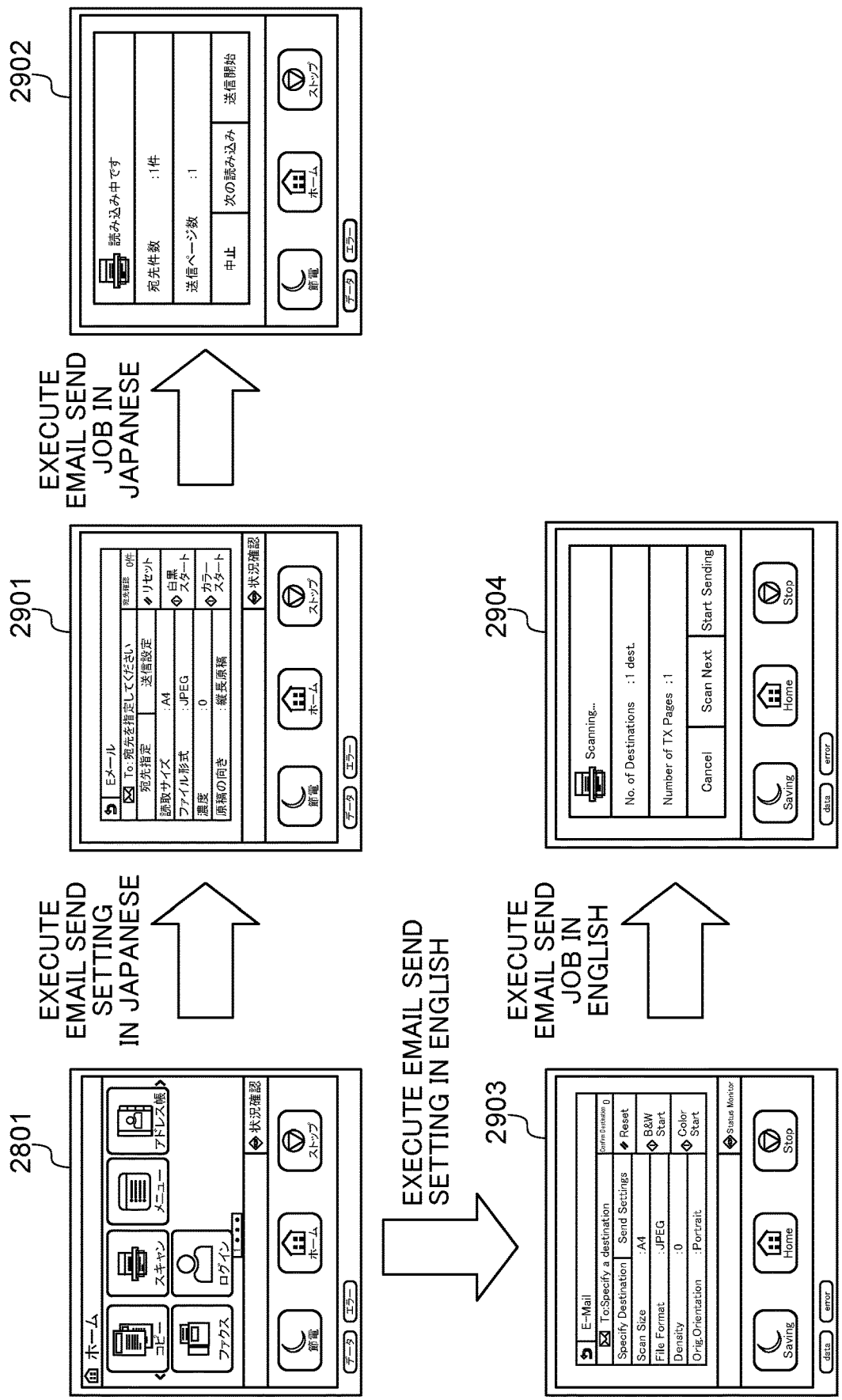
FIG. 29 is a view showing screen transitions of the operation panel of the MFP when the setting of an EMAIL SEND job is input by user's voice.

FIG. 29 is a view showing screen transitions of the operation panel 209 of the MFP 101 when the setting of an EMAIL SEND job is input by user's voice.

As shown in FIG. 29, when the MFP 101 receives the language-set job information including {"language": "Japanese"}, {"operation": "jobSetting"}, and {"jobName": "emailSend"} from the cloud server 103 in the state where the home screen 2801 is displayed on the operation panel 209, the MFP 101 sets the language setting to Japanese. A scan setting screen 2901 the display language of which is Japanese is displayed on the operation panel 209. After that, when the user gives a job execution instruction from the smart speaker 102 or the operation panel 209, the job control module 503 executes the EMAILSEND job, and a scanning screen 2902 the display language of which is Japanese is displayed on the operation panel 209.

Moreover, when the MFP 101 receives the language-set job information including {"language": "English"}, {"operation": "jobSetting"}, and {"jobName": "emailSend"} from the cloud server 103 in the state where the home screen 2801 is displayed on the operation panel 209, the MFP 101 sets the language setting to English. A scan setting screen 2903 the display language of which is English is displayed on the operation panel 209. After that, when the user gives a job execution instruction from the smart speaker 102 or the operation panel 209, the job control module 503 executes the EMAILSEND job, and a scanning screen 2904 the display language of which is English is displayed on the operation panel 209.

According to the embodiment mentioned above, a morpheme string that consists of a plurality of morphemes is obtained on the basis of a phrase that the smart speaker 102 obtained, a language is specified using the morpheme string concerned, and a display language of the operation panel 209 is updated on the basis of the specified language. That is, the display language of the operation panel 209 is changed to a user's using language without giving a setting operation about the display language of the operation panel every time when the user starts to use the MFP 101. This can reduce the time and effort of a user for setting a display language.

Moreover, in the embodiment mentioned above, the cloud server 103 obtains a morpheme string on the basis of user's voice that the smart speaker 102 obtained. Accordingly, the cloud server 103 can promptly execute the process to specify a language using the obtained morpheme string.

In the embodiment mentioned above, when a determination exception morpheme is included in a morpheme string, a language is specified using morphemes other than the determination exception morpheme in the morpheme string. Thereby, accuracy of specifying a language is improved.

Although the present invention is described using the embodiment mentioned above, the present invention is not limited to the embodiment mentioned above. For example, when the MFP 101 is provided with the microphone 308, the MFP 101 may transmit audio data generated on the basis of user's voice obtained with the microphone 308 to the cloud server 103.

The MFP 101 may be configured to be connectable to another external display device without having the operation panel 209.

Moreover, when the external display device is provided with the microphone 308, the external display device may transmit audio data generated on the basis of user's voice obtained with the microphone 308 to the cloud server 103.

Furthermore, when the MFP 101 that is connectable to an external display device without having the operation panel 209 is provided with the microphone 308, the MFP 101 may transmit audio data generated on the basis of user's voice obtained with the microphone 308 to the cloud server 103.

The MFP 101 may obtain a morpheme string on the basis of audio data generated on the basis of user's voice obtained with the microphone 308 of the MFP 101 or audio data obtained from the smart speaker 102 and may transmit the obtained morpheme string to the cloud server 103. This can distribute a load needed to execute the process to obtain the morpheme string on the cloud server 103.

When only the determination exception morphemes are included in the morpheme string obtained on the basis of the obtained phrase, the display language of the operation panel 209 may be updated on the basis of a language specified using a morpheme string obtained from another phrase that the smart speaker 102 obtains after obtaining the previous phrase. For example, even if the language determination is impossible because the phrase uttered by the user consists of only determination exception morphemes like "kopi", the display language of the operation panel 209 will be changed to Japanese when the user will utter a phrase, such as "sanbukopishite", including morphemes other than the determination exception morphemes and the language will be specified as Japanese. Thereby, the display language can be switched at a timing of specifying the language during the interactive session without requiring a user to set the display language.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-084478, filed May 13, 2020, which is hereby incorporated by reference herein in its entirety.

What is claimed is:

1. An image forming system comprising:
    an image forming device configured to form an image on a sheet;
    a display device configured to display information;
    a microphone configured to obtain voice;
    an obtainment unit configured to obtain one or more pieces of word information based on audio information on the phrase obtained through the microphone;
    a specification unit configured to specify a language using the one or more pieces of word information, and specify a function using the one or more pieces of word information; and
    a display control unit configured to control the display device to display a function screen corresponding to the specified function without updating a display language in a case where the function is specified by the specification unit and the language is not specified by the specification unit.

2. The image forming system according to claim 1, wherein one apparatus that constitutes the image forming system has the image forming device, the display device, and the microphone.

3. The image forming system according to claim 1, wherein one apparatus that constitutes the image forming system has one of the image forming device, the display device, and the microphone, and
    wherein an apparatus that constitutes the image forming system and is other than the one apparatus has one or more of the image forming device, the display device, and the microphone, except one that the one apparatus has.

4. The image forming system according to claim 3, further comprising an image forming apparatus and a voice obtainment device,
    wherein the voice obtainment device has the microphone, and
    wherein the image forming apparatus has the image forming device and the display device.

5. The image forming system according to claim 4, wherein the image forming apparatus has the obtainment unit.

6. The image forming system according to claim 1, further comprising a server,
    wherein the server has the obtainment unit.

7. The image forming system according to claim 1, wherein the specification unit specifies the language using the word information other than language-specification-impossible-word information among the one or more pieces of word information in a case where the one or more pieces of word information include the language-specification-impossible-word information that cannot specify one language.

8. The image forming system according to claim 1, wherein the display control unit updates the display language of the display device based on a language specified using word information obtained from audio information on a phrase that is obtained after obtaining the previous phrase in a case where the word information obtained based on the audio information on the previous phrase includes only language-specification-impossible-word information.

9. The image forming system according to claim 1, wherein the function is one of a copy function, a print function, a set function, and a send mail function.

10. A control method for an image forming system having an image forming device that forms an image on a sheet, a display device that displays information, and a microphone that obtains voice, the control method comprising:
    obtaining a one or more pieces of word information based on audio information on a phrase obtained through the microphone;

specifying a language using the one or more pieces of word information, and specifying a function using the one or more pieces of word information; and controlling the display device to display a function screen corresponding to specified function without updating a display language in a case where the function is specified and the language is not specified.

11. A non-transitory computer-readable storage medium storing a control program causing a computer to execute a control method for an image forming system having an image forming device that forms an image on a sheet, a display device that displays information, and a microphone that obtains voice, the control method comprising:

obtaining a one or more pieces of word information based on audio information on a phrase obtained through the microphone;

specifying a language using the one or more pieces of word information, and specifying a function using the one or more pieces of word information; and controlling the display device to display a function screen corresponding to specified function without updating a display language in a case where the function is specified and the language is not specified.

* * * * *